(12) United States Patent
Staver et al.

(10) Patent No.: US 12,126,651 B2
(45) Date of Patent: Oct. 22, 2024

(54) SYSTEM AND METHOD FOR ATTORNEY-CLIENT PRIVILEGED COMMUNICATION

(71) Applicant: Make the Connection, Inc., Dexter, MI (US)

(72) Inventors: Peter J. Staver, Southgate, MI (US); Rosetta McMahon, Southgate, MI (US); Jonathan A. Baron, Dexter, MI (US)

(73) Assignee: Make the Connection, Inc., Tayor, MI (US)

( * ) Notice: Subject to any disclaimer, the term of this patent is extended or adjusted under 35 U.S.C. 154(b) by 408 days.

(21) Appl. No.: 17/464,330

(22) Filed: Sep. 1, 2021

(65) Prior Publication Data

US 2022/0070220 A1   Mar. 3, 2022

Related U.S. Application Data

(60) Provisional application No. 63/073,768, filed on Sep. 2, 2020.

(51) Int. Cl.
| | |
|---|---|
| *H04L 9/40* | (2022.01) |
| *G06Q 20/12* | (2012.01) |
| *G06Q 30/018* | (2023.01) |
| *G06Q 50/18* | (2012.01) |

(52) U.S. Cl.
CPC ........... *H04L 63/18* (2013.01); *G06Q 20/127* (2013.01); *G06Q 30/018* (2013.01); *G06Q 50/18* (2013.01); *H04L 63/083* (2013.01); *H04L 2463/082* (2013.01)

(58) Field of Classification Search
CPC . H04L 63/18; H04L 63/083; H04L 2463/082; H04L 63/0807; G06Q 20/127; G06Q 30/018; G06Q 50/18; G06Q 20/145; G06Q 20/3821; G06Q 20/405
See application file for complete search history.

(56) References Cited

U.S. PATENT DOCUMENTS

| | | | |
|---|---|---|---|
| 9,680,838 B1* | 6/2017 | Hodge | H04L 65/1073 |
| 2006/0165060 A1* | 7/2006 | Dua | G06Q 20/401 |
| | | | 705/76 |
| 2009/0165098 A1* | 6/2009 | Ifrah | G06Q 20/02 |
| | | | 705/317 |

(Continued)

*Primary Examiner* — J. Brant Murphy
(74) *Attorney, Agent, or Firm* — Quinn IP Law

(57) ABSTRACT

A system and method for conducting a privileged communication session between a client user and an attorney subscriber includes initiating a communication session between the client user and the attorney member in response to a communication session request, via a communication application where the communication session is configured to be selectively conducted via the communication application in a non-privileged mode and in a privileged mode such that in the non-privileged mode, the communication session is conducted via a communication server in communication with a user client computing device and an attorney computing device, and such that in the privileged mode the communication session is conducted via a direct communication link initiated via the communication application such that, in the privileged mode the communication server is disconnected from the direct communication link.

15 Claims, 19 Drawing Sheets

(56) References Cited

U.S. PATENT DOCUMENTS

| | | | | |
|---|---|---|---|---|
| 2010/0274634 | A1* | 10/2010 | Ifrah | G06Q 20/40 |
| | | | | 726/30 |
| 2011/0252146 | A1* | 10/2011 | Santamaria | H04L 65/1104 |
| | | | | 709/227 |
| 2015/0371053 | A1* | 12/2015 | Welch | G06F 21/6227 |
| | | | | 726/30 |
| 2016/0140352 | A1* | 5/2016 | Nickolov | H04W 12/02 |
| | | | | 726/26 |
| 2017/0019402 | A1* | 1/2017 | Kulkarni | H04L 63/0861 |
| 2017/0302671 | A1* | 10/2017 | Rivelli | H04L 51/224 |
| 2018/0261307 | A1* | 9/2018 | Couse | H04L 63/0428 |
| 2021/0075791 | A1* | 3/2021 | Dunjic | H04L 63/0807 |

* cited by examiner

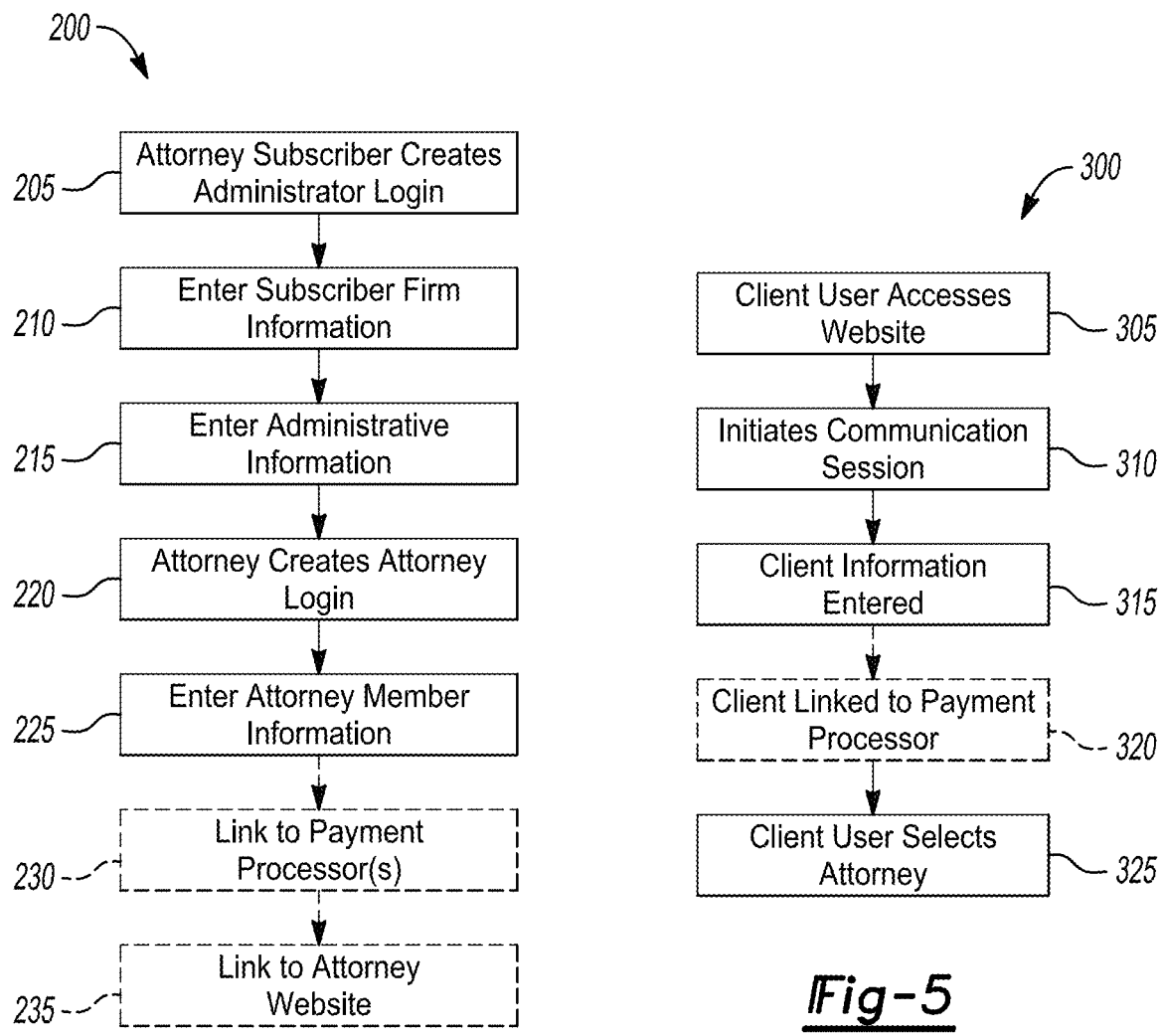

_Fig-7_

_Fig-8_

Registration Info [X]

Account executive - Manager/Lawyer #1

Name *
[                    ]

Email address in firm (do not use your personal email) *
[                    ]

Confirm address in firm *
[                    ]

Phone number *
[(123) 456-7890]

State *          P# (Bar ID#) *
[  ▽  ]          [          ] ← 64

[Back] [Next]

*Fig-12*

| Video Player | Settings |          | Change Profile | Logout |

Add Lawyer                    ✕

Name:  [          ]
Email: [          ]
Bar:   [Please Select ▽]
Bar ID:[          ] ← 64

[Enter] [Cancel]

*Fig-13*

| Home | About Us | Attorneys | What You Will Need | Contact Us |

Welcome!
Meet Your New Attorney

Jon Clarke —— 68
Davison, Clarke & Howard
Sometown, Michigan 48921
General Practice Attorney specializing in: probate and estate planning, elder law, medical licensure restoration, real estate, landlord/tenant, corporations/business, traffic/criminal, Medicaid, Disability, personal injury and Chapter 7 Bankruptcy
Licensed in the State of Michigan Peter Howard —— 68
Davison, Clarke & Howard
Sometown, Michigan 48921
General Practice Attorney specializing in: divorce, child support, child custody, probate, estate planning, real estate criminal and general civil litigation
Licensed in the State of Michigan Susan Lawyer —— 68
Litigation Associates, P.C.
Acity, Michigan 48111
Litigation Attorney specializing in: criminal and civil litigation, small business and real estate matters, title insurance carriers and real property interests; represents bar Candidates for post-exam Appeals, Character and Fitness issues and Private Bar Examination tutoring; represents the interests of tenured teachers before the Teachers Tenure Commission, administrative law matters; coaches sole practitioners and small firms in firm growth, increased efficiency and practice development

Fig-18

SYSTEM AND METHOD FOR ATTORNEY-CLIENT PRIVILEGED COMMUNICATION

RELATED APPLICATION

This application claims the benefit of and priority to U.S. Provisional Application No. 63/073,768 filed Sep. 2, 2020, the contents of which are hereby incorporated by reference in their entirety.

TECHNICAL FIELD

The present disclosure relates to the field of communication software and hardware implementations thereof. Specifically, the present disclosure relates to computer-implemented systems and methods for conducting a privileged communication between a client user and an attorney member of an attorney subscriber, via a network.

BACKGROUND

In common law, legal privilege protects communications which occur between a legal advisor, such as an attorney, and the legal advisor's client from being disclosed without the permission of the client. In most jurisdictions, for attorney-client privilege to apply to a communication, the general rules require that: (1) the communication be between a client and an attorney, the attorney being a member of the bar of a court and acting as an attorney for the client, or an agent of an attorney such as a tax accountant, a patent agent, a forensic investigator, a technical analyst, or an expert; (2) the communication be made by the client and contain confidential information; (3) the communication be made outside the presence of a nonprivileged third party; (4) the communication be made for the purpose of securing legal advice; and (5) the privilege has not otherwise been waived by the client. Privileged communications can be written, visual (imagery) or oral, but only communications between or among "privileged" persons are protected.

SUMMARY

Although the privilege is that of the client and not the attorney, the attorney is responsible for the client's privilege. For computer-implemented communications that occur online, for example, via a network, establishing a privileged communication requires managing both the technical characteristics of online privacy, and the expectations of all parties of that conversation. The methods and systems described herein are therefore intended to provide a computer-implemented system for selectively establishing a privileged online communication between a client user and an attorney member of an attorney subscriber, where the privileged status of the communication is visually apparent to each of the parties participating in the online communication. In one example, the methods and systems can include verifying the credentials of each attorney member of an attorney subscriber as a member of a bar of a court. The methods and systems are configured such that the privileged online communication is conducted using peer to peer conferencing between the client user and an attorney member of the attorney subscriber selected by the client user, such that the privileged online communication can be made outside the presence of a nonprivileged third party, including, in the present example, an application server and/or a non-attorney member of the attorney subscriber, the privileged online communication can be protected by encryption, and the privileged online communication can be conducted without retention by any third party of any records of data sent via the privileged and encrypted channel connecting the attorney member and the client user. Additionally, the methods and systems described herein provide a client enrollment and payment system which, in one example, is configured such that attorney time billable to the client user is accounted only during the time a privileged communication is being conducted, e.g., during the time that the communication session interface is enabled in a privileged mode.

The computer-implemented system described herein is configured for conducting a privileged communication session between a client user and an attorney subscriber, the method comprising accessing, via a network, a communication application having a corresponding communication server, where the communication server comprises a memory and a processor, where the communication application is accessed by a client user via a client user computing device in communication with the network and where the communication application is accessed by an attorney subscriber via an attorney computing device in communication with the network. The method includes inputting, via the client user computing device and the communication application, a communication session request to the attorney subscriber, and further includes initiating a communication session between the client user and the attorney member in response to the communication session request, via the communication application. The communication session is configured to be selectively conducted via the communication application in a non-privileged mode and in a privileged mode, where in the non-privileged mode, the communication session is conducted via the communication server in communication with the user client computing device and the attorney computing device, and where in the privileged mode the communication session is conducted via a direct communication link initiated via the communication application such that, in the privileged mode, the communication session is conducted between the user client computing device and the attorney computing device via the direct communication link, and the communication server is disconnected from the direct communication link.

The method further includes enrolling the client user to the communication system, which in a non-limiting example includes inputting client user enrollment information via the communication application, receiving the client user enrollment information to the communication server, and storing the client user enrollment information in a data storage in communication with the communication server. The client user enrollment information can include payor payment information, and the method can further include associating payor payment information with the client user in the data storage. Inputting client user enrollment information via the communication application can include providing payor payment information to a payment processor via the communication application, generating, via the payment processor, a payor token associated with the payor payment information, where the client user enrollment information includes the payor token, and associating the payor token with the client user in the data storage. In one example, the client user enrollment information includes payor payment information, and the method includes associating payor payment information with the client user in the data storage. The method can further include providing payor payment information to a payment processor via the communication application, generating, via the payment processor, a payor token associated with the payor payment information, where the client user enrollment information includes the payor token and associating the payor token with the client user in the data storage.

In a non-limiting example, the method further includes registering the attorney subscriber to the communication system, by inputting attorney subscriber registration information via the communication application, receiving the attorney subscriber registration information to the communication server, and storing the attorney subscriber registration information in a data storage in communication with the communication server. In one example, the attorney subscriber includes an attorney member, and the registration information includes attorney credential information corresponding to the attorney member, and the method further includes associating the attorney credential information with the attorney member in the data storage. In a non-limiting example, the method further includes verifying the status of the attorney credential information of the attorney member and associating the verified status with the attorney credential information in the data storage. The method can include periodically reverifying the status of the attorney credential information of the attorney member, and revoking the verified status when the attorney credential cannot be reverified. These and other features, advantages, and objects of the present disclosure will be further understood and appreciated by those skilled in the art by reference to the following specification, claims, and appended drawings. The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings.

BRIEF DESCRIPTION OF THE DRAWINGS

FIG. 4 is a schematic flowchart describing a method for registering an attorney subscriber in the communication system of FIG. 1;

FIG. 5 is a schematic flowchart describing a method for enrolling a client user in the communication system of FIG. 1;

FIGS. 7-25 depict possible embodiments of user interfaces of the communication application of FIG. 1 including:

FIGS. 7-16 depicting possible embodiments of user interfaces for registering an attorney subscriber to the communication system of FIG. 1;

FIGS. 17-21 depicting possible embodiments of user interfaces for use by a client user in enrolling to and/or initiating a communication session using the communication system of FIG. 1;

FIGS. 22-25 depicting possible embodiments of user interfaces for use by an attorney subscriber in responding to a request for a communication session using the communication system of FIG. 1;

FIG. 26 showing an example user interface for conducting a communication session in a non-privileged mode;

FIG. 27 showing an example user interface for conducting a communication session in a privileged mode;

FIG. 28 showing an example user interface for conducting a communication session including three or more participants; and FIG. 29 showing an example user interface for conducting a communication session including placing a call segment of the communication on hold.

Figure 1:
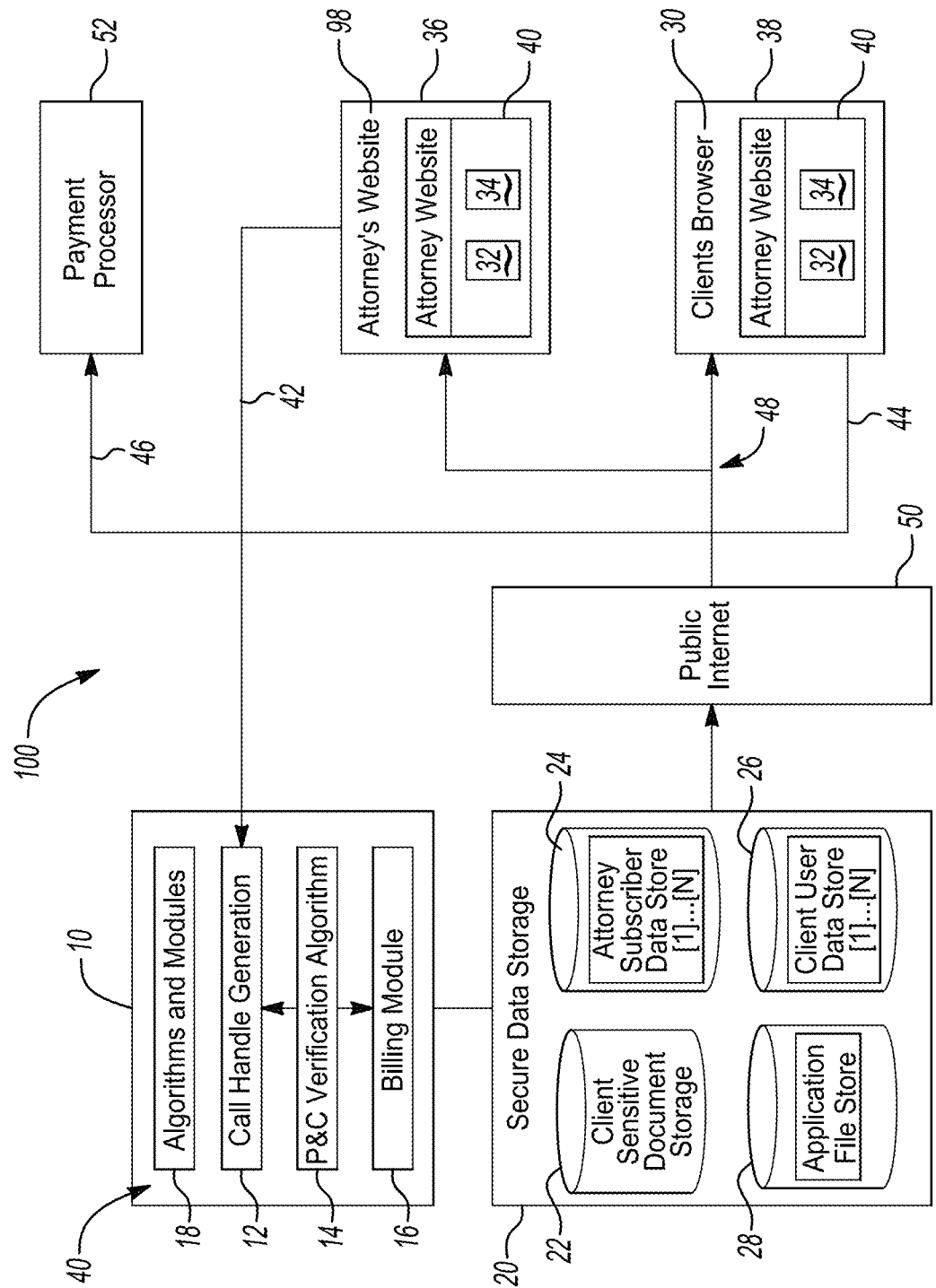
FIG. 1 illustrates an exemplary embodiment of a communication system including a communication application for selectively conducting a privileged online communication between an attorney subscriber and a client user in accordance with the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

DETAILED DESCRIPTION

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps.

It is to be understood that various alternative orientations and step sequences may be envisioned, except where expressly specified to the contrary. Also for purposes of the present detailed description, words of approximation such as "about," "almost," "substantially," "approximately," and the like, may be used herein in the sense of "at, near, or nearly at," or "within acceptable operating tolerances," or any logical combination thereof. It is also to be understood that the specific devices and processes illustrated in the attached drawings, and described in the following specification, are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
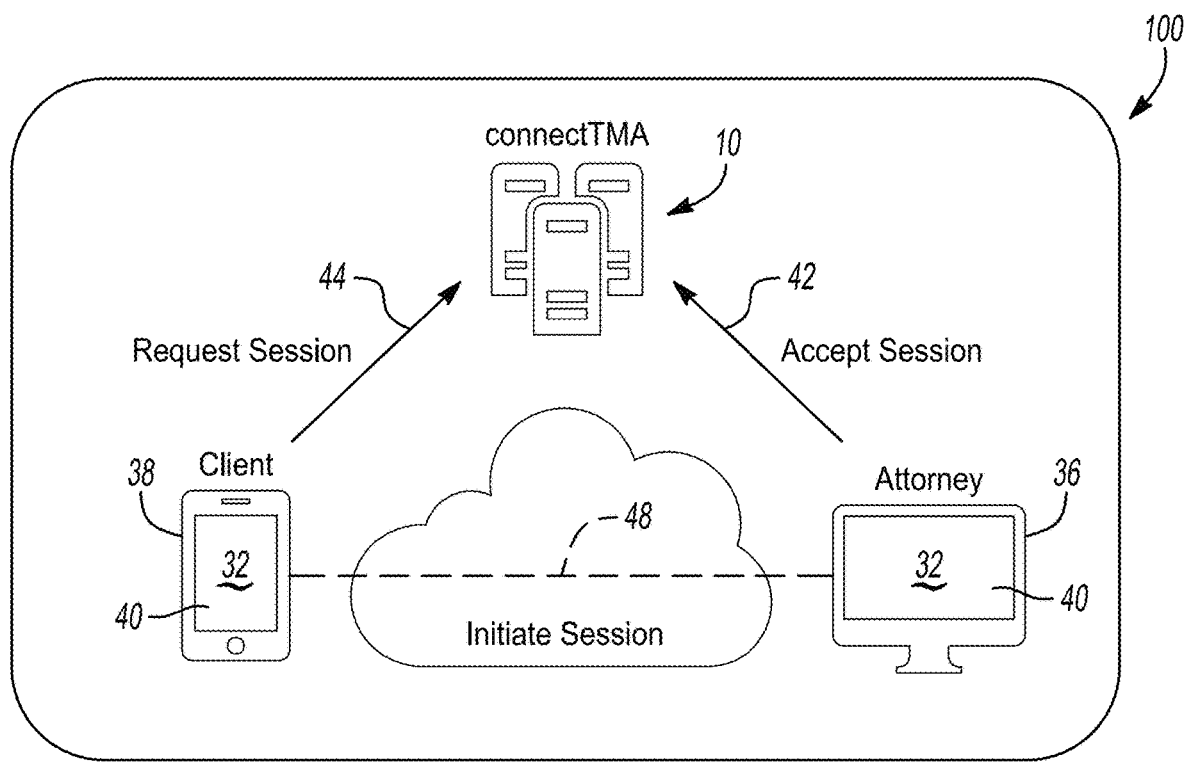
FIG. 2 is a schematic illustration of the system of FIG. 1, showing an example configuration of the system of FIG. 1 operating in a non-privileged communication mode.
Figure 3:
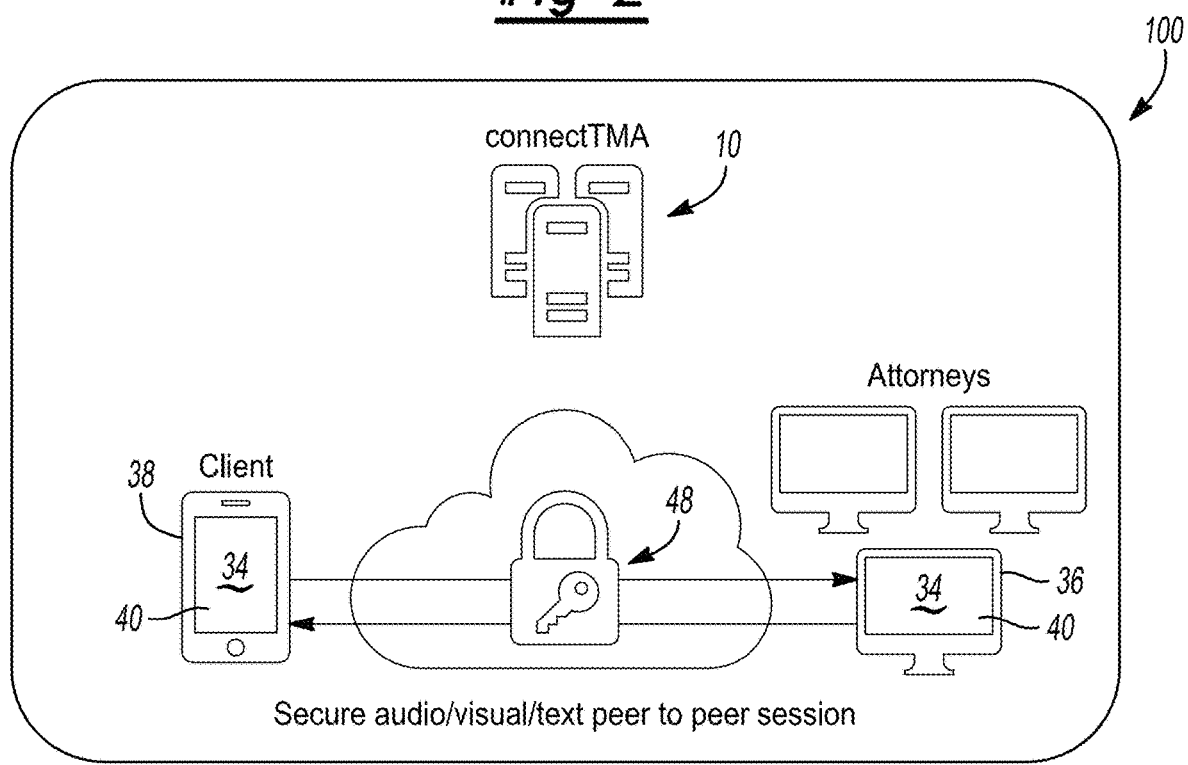
FIG. 3 is a schematic illustration of the system of FIG. 1, showing an example configuration of the system of FIG. 1 operating in a privileged communication mode.
Figure 17:
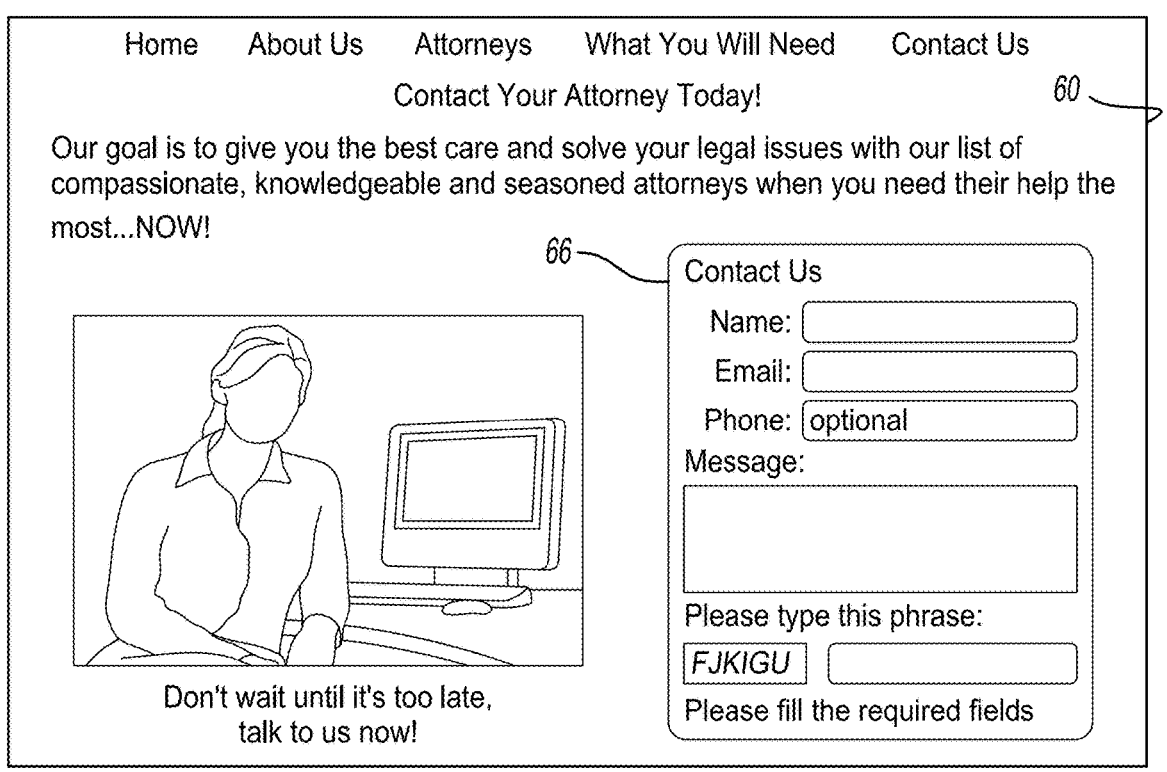
Figure 26:
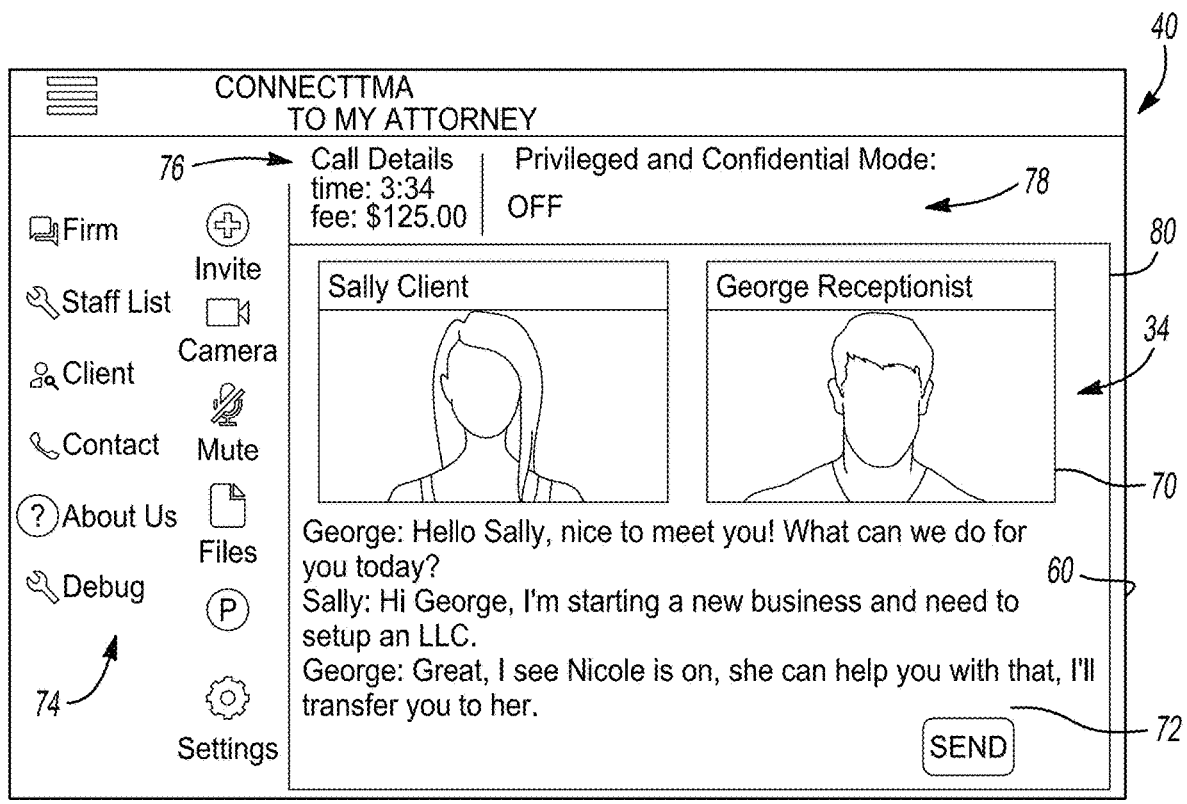
FIGS. 26-29 depict possible embodiments of user interfaces of the communication application, including video and messaging interfaces for conducting a communication session using the communication system of FIG. 1, including.

Referring to FIGS. 1-6, shown is a computer-implemented communication system 100 and methods 200, 300, 400 for selectively establishing a communication session between a client user and an attorney subscriber, where the communication session can be selectively conducted in a non-privileged mode as shown in FIG. 2, or a privileged mode as shown in FIG. 3. The communication session is conducted via a communication application 40, which can be configured as a web application accessible from a computing device, via a web browser 30 and a network 50 accessed using the computing device. The network, as used herein, can refer to a network via which data and web applications can be transferred between two or more of the server 10, data storage 20, client user computing device 38, attorney computing device 36, and/or payment processor 52, and may also be referred to herein as the Internet, the cloud, the worldwide web, etc. In the example shown in FIGS. 1-3, the computing device can be a client user computing device 38 and/or an attorney subscriber computing device 36. In a non-limiting example, the computing device 36, 38 can be configured as a personal computer, tablet, laptop, smart phone, personal digital assistant, or other personal computing device configured to access the network 50 via a web browser 30, and/or to access the communication application 40. The computing device 36, 38 can be configured to connect to the network 50, for example, via a wired or wireless connection. As described in further detail herein, the communication application 40 can be hosted on an attorney subscriber's website 98, also referred to herein as an attorney website 98, such that the communication application 40 can be accessed by a client user using a client user computing device 38 and web browser 30 to access the attorney website 98, or accessed by a client user via a hyperlink to the attorney website 98, for example, the hyperlink provided to the client user from the attorney website 98 and/or via an electronic message such as an email or SMS message sent to the client user. In a first example shown in FIGS. 17 and 18, the attorney website 98 can be configured as a centralized system website such as the "CONNECTTMA" website shown in FIG. 17, which provides a client enrollment interface 66 through which a client user can enroll in the communication system 100 (see FIG. 5) and once enrolled, directed to a web interface as shown in FIG. 18 providing a listing 82 of attorney subscriber law firms, law firm information 96, and/or attorney members of the attorney subscriber law firms registered to the communication system 100, from which the enrolled client user can select an attorney subscriber, and/or can select an attorney member of an attorney subscriber, and request a communication session with the selected attorney subscriber and/or selected attorney member. For example, the client user can activate a hyperlink 68 which will redirect the client user directly to a communication session interface 34 and to a receptionist associated with the selected attorney subscriber, as shown in FIG. 26, to request a communication session with an attorney member of the selected attorney subscriber, where the attorney member may not yet be selected by the client user, but may be selected with assistance from the receptionist and/or based on availability of the attorney member(s) of the attorney subscriber. In another example, the system 100 can be configured such that activating the hyperlink 68 can redirect the client user to the firm website such as the website for the law firm "Davison, Clarke & Howard" in the non-limiting example shown in FIGS. 19 and 21, which will present a call request interface 32, in the example shown, an icon labeled "Start your Video Call" for activation by the client user to request a communication session with a representative of the attorney subscriber law firm. In one example, the client user may be connected to a receptionist via a communication session interface 34, as shown in FIG. 26. In another example shown in FIG. 20, the client user, upon activating the "Start your Video Call" icon, may be directed to a listing 82 of the attorney members associated with the attorney subscriber law firm, from which the client user can select an attorney member and request a communication session with the selected attorney member. The examples shown are illustrative, and it would be understood that combinations and variants of these configurations are anticipated within the scope of the disclosure. For example, the communication system 100 may be configured such that the communication application 40 is accessible through either or both of the centralized website 98 ("Connecttma.com" in the present example) and the law firm attorney website 98 of the specific law firm with which the client user wishes to request a communication session, and/or via a hyperlink provided to the client user, for example, via an email, SMS or other electronic message. For example, the communication system 100 may be configured such that the client user, when activating a session request either through the centralized website or law firm attorney website 98 is selectively directed to a receptionist via the communication session interface 34, when the system 100 indicates the receptionist is available, or otherwise, is selectively directed to an attorney listing 82 for selection of a specific attorney member within the law firm, for example, by activating a hyperlink or call request interface 32 associated with the selected attorney member, as shown in FIG. 20. In one example, as shown in FIG. 20, the attorney listing 82 may be configured to indicate the status and/or availability of each attorney member of the attorney subscriber for a communication session, in real time, and/or to display a message or predetermined information associated with each attorney member.

Referring again to FIG. 1, the communication application 40 may be embodied as a web application on any type of computer device, e.g., a centralized server or host computer, such as server 10 shown in FIG. 1, or as shown in FIGS. 2-3, as a distributed cloud-based server/server cluster 10(1) . . . 10(N) programmed in software and equipped in hardware to perform the process steps detailed below, for instance having one or more processors, microprocessors, volatile and non-volatile memory, input/output circuitry, high-speed clock, etc. While shown as a single server 10 in FIG. 1 for illustrative clarity and simplicity, those of ordinary skill in the art will appreciate that the functions of the communication server 10 may be distributed so as to reside in different networked locations. That is, the server 10 may be hosted on one or more relatively high-power computers as shown in FIG. 1 and/or over a network connection 50/cloud computing as shown in FIGS. 2-3, with the latter possibly breaking functions of the server 10 into subsets that are then executed by the various computer devices. In other words, the term "server" as it related to the central server 10 may be distributed and/or possibly residing aboard one or more computer devices 10(1) . . . 10(N), as with the exemplary embodiment of the system 100 shown in FIGS. 2-3. Various algorithms and/or modules 18 required to operate the communication system 100 as described herein can be stored to the server 10. It should be appreciated that the term "algorithm" should be construed to mean a digital computing module of software stored in tangible memory and executing on one or more hardware processors. The algorithms and modules 18 can include, as shown in FIG. 1, a call handle generation algorithms and modules 12 for receiving and processing a communication session request initiated by a client user via the communication application 40, a privileged and confidential (P&C) verification algorithm 14 for transitioning a mode of the communication session between a privileged communication mode and a non-privileged communication mode, and a billing module 16 for executing billing functions as further described herein. In one example, the billing module 16 is in communication with a payment processor 52, for processing a payment from a client user to an attorney subscriber.

In a non-limiting example, the P&C verification algorithm 14 can be configured to verify credentials 64 of an attorney member as a "privileged" person, e.g., as a person qualified to conduct a privileged communication with a client user. In one example, the P&C verification algorithm 14 can be configured to verify credentials 64 of an attorney subscriber with the respective bar association, court and/or government office licensing and/or qualifying the respective attorney subscriber to practice law, act as a legal advisor and/or enter into a privileged communication with a user client. The P&C verification algorithm can be configured to verify credentials 64 at time of registration of the attorney subscriber and/or periodically thereafter, for example, on a monthly, bi-monthly, quarterly, yearly basis, etc. The P&C verification algorithm can be configured to verify credentials 64 on an event basis, for example, each time the attorney subscriber logs into the system 100. The P&C verification algorithm can be configured to receive notifications from the respective bar association, court and/or government office licensing and/or qualifying the respective attorney subscriber, confirming the qualification of the respective attorney subscriber, and/or notifications that the qualification of the respective attorney subscriber has been suspended and/or revoked. The P&C verification algorithm can be configured to periodically prompt the respective attorney subscriber to reaffirm their qualification, for example, by re-entering their credential information 64, for example, their bar identification number, at a predetermined period, such as each time the attorney subscriber logs into the system 100, or on a monthly, quarterly, annual, etc. basis. In a non-limiting example, the P&C verification algorithm can be configured to suspend and/or revoke the attorney subscriber's login credentials, for example, upon receipt of notification of revocation or suspension of the attorney subscriber's qualifications, failure of the attorney subscriber to reaffirm their qualification, etc., thereby preventing the attorney subscriber from logging in to the system until such time that the attorney subscriber's qualifications and/or credential information 64 is revalidated in the system 100.

In one example, the server 10 and/or the communication application 40 includes a timer, and the P&C verification algorithm 14, the call handle generation module 12 and/or the billing module 16, or a combination of these, can be configured, in response to input received via the communication application 40 from the client user, attorney subscriber and/or attorney member during a communication session, to transition the communication session between the non-privileged mode and the privilege mode, to activate the timer when the communication session is transitioned from a non-privileged mode to a privileged mode, and to deactivate the timer when the communication session is transitioned from the privileged mode to the non-privileged mode, to determine the elapsed time in the privileged mode, store the elapsed time for use in determining billing for the communication session, transmit the elapsed time, attorney member billing rate and/or other information, for example, the payor and payee tokens corresponding to the client user and the attorney subscriber (as described further herein), to the billing module 15 and/or to the payment processor 52 to generate a bill and/or process a payment associated with the communication session. The algorithms and modules 18 can include additional algorithms and/or modules as required to perform the methods described herein, including, for example, algorithms and/or modules for registering an attorney subscriber to the communication system 100 (see FIG. 4) and/or enrolling a client user to the communication system 100 (see FIG. 5).

As shown in FIG. 1, the communication system 100 further includes a secure data storage 20 configured to store data received via the communication application 40, for example, during enrollment of a client user and/or registration of an attorney subscriber, and/or as required to conduct a communication session using the communication system 100 and/or methods 200, 300, 400 described herein. By way of example, the secure data storage 20 may be accessed via the network 50 and/or can be accessible via the communication server 10. The secure data storage 20 can include, by way of example, sufficient read only memory (ROM), optical memory, flash or other solid state memory, and the like to store data received during operation of the communication system 100 and/or performance of the methods 200, 300, 400. Transitory memory such as random access memory (RAM) and electrically-erasable programmable read-only memory (EEPROM) may also be included, along with other required circuitry (not shown), including but not limited to a high-speed clock, analog-to-digital (A/D) circuitry, digital-to-analog (D/A) circuitry, a digital signal processor, and any necessary input/output (I/O) devices and other signal conditioning and/or buffer circuitry. In an illustrative example, the secure data storage 20 can be configured as a MySQL database stored in a secure environment. The data storage 20 and/or database can include a plurality of data tables and data types which can be related to each other in a relational database, such that the data can be stored, modified, associated, retrieved and extracted as needed to operate the communication system 100 and/or perform the methods described herein, including methods 200, 300, 400.

In a non-limiting example, the data storage 20 can include data structures configured for client sensitive document storage 22, attorney subscriber data storage 24, application file data storage 28, and/or client user data storage 26. Data stored in these data structures can include, for example, data collected by the communication system 100 during registration of an attorney subscriber, during enrollment of a client user, payment information including client user payor information and attorney subscriber payee information, storage of attorney credential information including, for example, bar membership information for each respective attorney member of an attorney subscriber verifying the respective attorney member's qualification and/or license to practice law within a state or jurisdiction, and/or credential information showing admission to practice in a court or government office (such as the U.S. Patent and Trademark Office), demonstrating the respective attorney member is qualified to act as a legal advisor and/or enter into a privileged communication with a user client. Data stored in these data structures can include, for example, client sensitive documents such as personal identification information, payment information, and non-privileged data. As described in further detail herein, data stored in these data structures, such that it is accessible by the communication server 10 and/or by machine operators or administrators or others provided access to the communication system 100 under access control protocols established for the server 10 and/or the data storage 20, specifically excludes any data or records of data which is sent over the privileged channel 48, e.g., also referred to as the privileged network link 48, between the client user and the attorney member of the attorney subscriber when the communication session, including the communication session interface 34, is enabled in a privileged mode. Accordingly, the communication system 100 is configured to establish and protect the privileged and confidential condition of any data transferred between the client user and the attorney member of the attorney subscriber when the communication session is operating in privileged mode, by purposefully configuring the communication system 100 such that the privileged and confidential data transferred during privileged portion of the communication system is inaccessible by the server 10 and/or is prevented from being stored to the data storage 20, for example, by configuring the communication system 100 such that no means for saving artifacts of the privileged portion of the communication session are provided by the communication system 100 to the client user, to the attorney subscriber, or to the attorney member participating in the communication session.

The configuration of the data storage 20 shown in FIG. 1 is illustrative, and it would be understood that other configurations of the data structures 22, 24, 26, 28 and/or additional data structure configurations are anticipated by the disclosure. For example, the secure data storage 20 can further include a payment information data store for storing payment tokens associated in the data structure with each of the client users enrolled in the communication system 100, and with each of the attorney subscribers registered in the communication system 100, where each payment token corresponds to either a payment method or account (payor token) from which a client user (payor) has authorized payment to an attorney subscriber, or to a deposit account (payee token) into which an attorney subscriber (payee) will receive payment from a client user. The payor tokens and payee tokens may be generated, respectively, during a client user enrollment process 400 and during an attorney subscriber registration process 300, by direct communication between the payor/payee with a payment processor 52, such that only the payor tokens and the payee tokens are stored to the data storage 20, and the payor and payee's actual payment and/or deposit information is not stored in the data storage 20, but rather maintained by the third party payment processor 52, and associated with the respective token. Advantageously, the server 10, for example, via the billing module 16, can transmit payment information in tokenized form between the data storage 20 and payment processor 52, to effect payment from a client user to an attorney subscriber, without accessing the actual payment/deposit information of the parties, such that the compliance to Payment Card Industry Data Security Standards (PCI DSS), or the like, is not required. The payment processor 52, in one example, can be configured to process a plurality of payment types, including credit and/or debit card transactions, wire transfers, ACH payments, mobile payments, etc. The payment processor 52 can include a plurality of payment processors 52(1) . . . 52(N) (not shown in FIG. 1 for simplicity of illustration), where for example, a first payment processor 52(1) may be used for credit and debit card transactions, a second payment processor 52(2) may be used for payments made by wire transfer, etc. In one example the attorney subscriber may be configured to act as their own payment processor 52.

Referring again to FIG. 1, as shown in the example, the data storage 20 can include an attorney subscriber data store 24 which comprises a plurality of data tables 24(1) . . . 24(N) where, for example, the first data table 24(1) is configured to store data associated with a first attorney subscriber, including, for example, data received from the first attorney subscriber during the registration process 200 such as, but not limited to, attorney credential information for each attorney member of the first attorney subscriber and payee payment information (which may be tokenized) for the first attorney subscriber, the second data table 24(2) is configured to store data associated with a second attorney subscriber, including, for example, data received from the second attorney subscriber during the registration process 200 such as, but not limited to, attorney credential information for each attorney member of the second attorney subscriber and payee payment information (which may be tokenized) for the second attorney subscriber, and so on. Likewise, the data storage 20 can include a client user data store 26 which comprises a plurality of data tables 26(1) . . . 26(N) where, for example, the first data table 26(1) is configured to store data associated with a first client user, including, for example, data received from the first client user during the enrollment process 300 such as the first client's contact information and payor payment information (which may be tokenized) for the first client, the second data table 26(2) is configured to store data associated with a second client user, including, for example, data received from the second client user during the enrollment process 300 such as the second client's contact information and payor payment information (which may be tokenized) for the second client, and so on. Advantageously, the data storage 20 is configured for operational efficiency such that a client user, for example, can be enrolled to the communication system 100 initially to conduct a communication session with a first attorney subscriber, and subsequently request a communication session with a second attorney subscriber without having to re-enroll and/or by providing a minimal incremental amount of additional information, for example, an additional or different payment method depending on the payment requirements of the second attorney subscriber.

The term "attorney subscriber" as used herein, can refer to, for example, a law firm ("firm") consisting of a single attorney member, e.g., a solo legal practitioner, a law firm including a plurality of attorneys and/or legal advisors (attorney members) qualified to enter into a privileged communication with a client, or other entity including a legal advisor or attorney (attorney member) qualified to enter into a privileged communication with a client. For simplicity of illustration, FIG. 1 shows a singular attorney website 98, although it would be understood that a plurality of attorney subscribers, e.g., two or more different attorney subscriber law firms, can register to the communication system 100, each respective attorney subscriber having a respective law firm attorney website 98 through which a client user can directly access the communication application 40 (see FIG. 19), or which can be accessed by a client user via a centralized attorney website 98 such as the "ConnectTMA.com" website previously described related to FIGS. 17 and 18.

The term "client user" as used herein refers to an individual or legal entity, such as a corporation, partnership, organization, etc., enrolled in the communication system 100 where the client user is at least one of a currently engaged client of at least one attorney subscriber registered to the communication system 100, a client user requesting a communication session with an attorney subscriber to establish a client-attorney relationship with the attorney subscriber, and/or a client user requesting a communication session with an attorney subscriber and attempting to become a client of the attorney subscriber at the time any protected information is disclosed during a privileged portion of a communication session subsequently established with an attorney member of the attorney subscriber via the communication system 100. In one example, a currently engaged client of a subscriber attorney may enroll as a client user to request an online communication session via the communication system 100, to utilize the online privileged communication capabilities of the communication system 100 as an alternative to a face-to-face in person meeting, for the convenience of the client user, avoiding the expense, loss of time and potential inconvenience of traveling to meet the attorney (attorney member) in person, and/or to conduct an online privileged communication session with the attorney member, for example, in situations where the client's circumstances, for example, a physical restriction, disability, injury, hospitalization, detention, etc., prevent or substantially impede the ability of the client to conduct an in person meeting with the attorney. For simplicity of illustration, FIG. 1 shows a single client computing device 38 and client browser 30, although it would be understood that a plurality of different client users can access the communication application 40 to enroll to the communication system 100, via a web browser 30 and client computing device 38. Further, it would be understood that a client user can access the communication application 40 via any web browser 30 and/or user computing device 38 to enroll in the communication system 100 and/or to request a communication session, for the convenience of the client user. For example, a client user can initially enroll to the communication system 100 using a first computing device 38 such as a personal laptop to access the communication application 40 via a browser 30, and may subsequently access the communication application 40 via a different client computing device 38, such as a tablet or smart phone, or a different browser 30 than the browser 30 used for enrollment, as convenient to the client user. Accordingly, the communication system 100 is advantaged by providing flexibility to the client user to access the communication application 40 for the purpose of requesting a communication session with an attorney subscriber from any location and/or via any computing device which allows the client user to access the communication application 40 via a web browser 30 and/or via the attorney website 98.

Likewise, once subscribed to the communication system, each member of the attorney subscriber can access the communication application 40 via any computing device 36 which allows the members (attorney members and non-attorney members, such as the law firm receptionist) of the attorney subscriber to access the communication application 40 via a web browser 30 and the attorney website 98, such that the attorney subscriber and/or an attorney member of the attorney subscriber can accept a communication session request and conduct a communication session including a privileged portion (in privileged mode) from any location, for the attorney member's own convenience and for the convenience of the client, also increasing the accessibility of the client to the attorney member, for example, at times when the attorney member is not physically located at the attorney's place of business and/or when privileged communication is required between the client user and attorney member outside of typical office hours, and/or when an in person meeting may not be feasible.

The term "privileged mode" as used herein refers to an operating state of the communication system 100 and/or the communication application 40 where a direct channel 48, which also may be referred to herein as a direct network link, a privileged network link, a peer-to-peer conference, and/or a person-to-person communication (videoconferencing and/or textual messaging) is established by the communication application 40 between the client user, via the client user computing device 38 and an attorney member of the attorney subscriber via the attorney's computing device 36, for example, as shown in example embodiments in FIGS. 1 and 3. When the communication system 100 and/or the communication application 40 is enabled and/or operating in the "privileged mode" the server 10 and non-privileged parties including, for example, the server 10, and non-attorney/non-privileged persons such as the receptionist of the attorney subscriber are excluded from the direct network link 48 connecting the client user and the attorney member. In an illustrative example, the communication application 40 initiates and/or facilities actuating of the privileged mode, including establishing the privileged network link 48, using WebRTC protocol, where the privileged network link 48 and the WebRTC connections between the client user computing device 38 and the attorney member's attorney computing device 36 are encrypted using Transport Layer Security (TLS) encryption protocol, and such that no records of data sent over the privileged network link 48 when the communication session is in privileged mode is kept, e.g., stored, downloaded, or otherwise recorded.

The term "non-privileged mode" as used herein refers to an operating state of the communication system 100 and/or the communication application 40 where non-privileged communication session data such as client enrollment information, attorney subscriber registration information, session request data, session initiation data, etc. via one or more network links 42, 44, 46. In a non-limiting example the communication application 40 can be configured to use Hypertext Transfer Protocol (HTTP) Strict Transport Security (HSTS) policy and TLS encryption on non-privileged communication between of the server 10, attorney computing device 36, client user computing device 38 and/or the payment processor 52, for example via the network 50 and network links 42, 44, 46, when the communication system 100 is activated by the communication application 40 to operate in non-privileged mode.

Referring again to FIG. 1, in a non-limiting example, web server software such as Microsoft Internet Information Services (HS) web server software is installed to the server 10, and the communication application 40 is implemented using ASP.NET web-application framework running on ITS, connected to a MySQL database which may be securely stored, for example, in the secure data storage 20. In the illustrative example, server software only communicates via TLS such that data is always encrypted in transit using TLS encryption. The server 10 is configured to enforce strict access control, including limiting access to only machine operators/administrators of the communication system 100. As shown in FIG. 2 and described by method 400, the server 10 manages only the initiation of the communication session, which may also be referred to herein as the conference or conference session, receiving a session request from a client user, via the client user accessing the communication application 40 via an attorney website 98. The communication application 40 during the session request and accept portions is operating in non-privileged mode, such that the session request initiated by a client user is communicated to the server 10, and communicated from the server to the attorney subscriber selected by the requesting client user for a response (see Accept Session shown in FIG. 2) via one or more network links 42, 44. The attorney subscriber can respond to the session request while in the non-privileged mode, where responding to and/or accepting the session request can include, in one example, a member of the attorney subscriber, for example, a receptionist, administrator, or an attorney member of the attorney subscriber, enrolling the client user in the communication system 100. In another example, the client user may be prompted by the communication application 40, when requesting the communication session, to self-enroll in the communication system 100, for example, by inputting information via a call request interface 32 presented via the attorney website 98 and browser 30 to the client user by the communication application 40.

Figure 27:
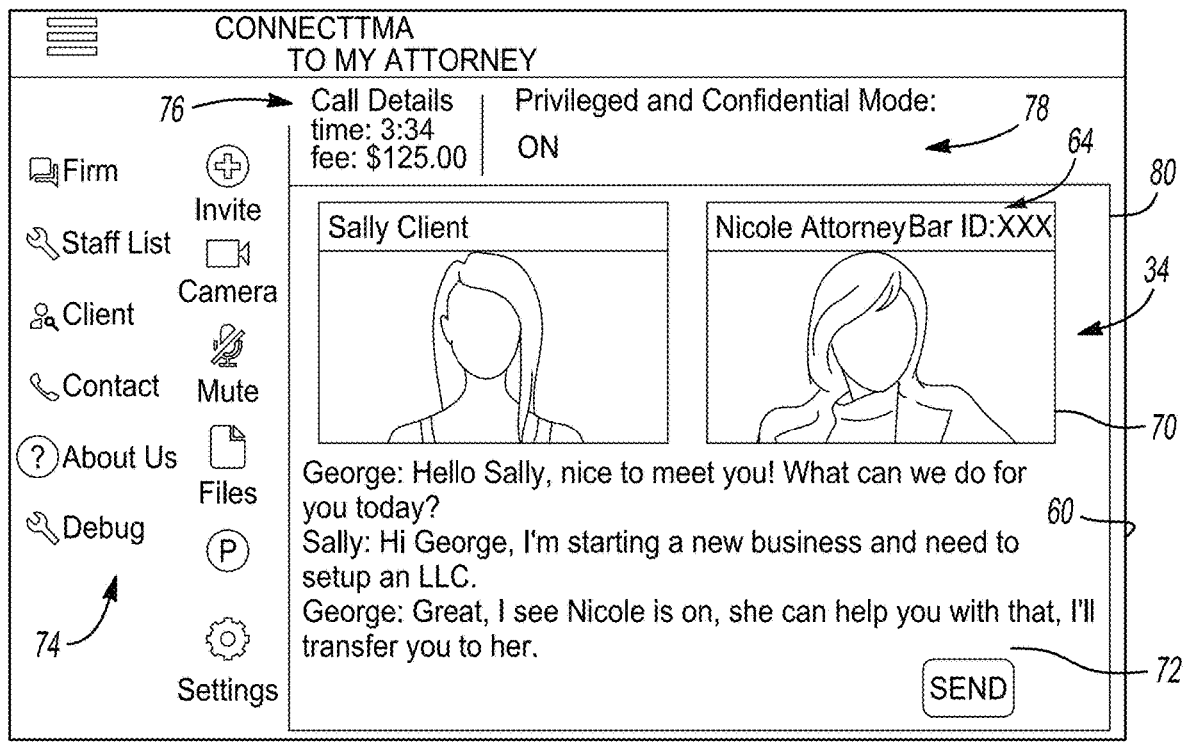

Once the server 10 with the communication application 40 creates the requested communication session and the client user is in communication with the attorney member via a communication session interface 34 generated by the server 10 and/or communication application 40, the communication session can be transitioned from a non-privileged mode (see FIG. 2 and FIG. 26) to a privileged mode as shown in FIG. 3 and FIG. 27, where the client user and attorney member are linked via the communication session interface 34, activated in a secure audio/visual/text peer to peer session, e.g., via a privileged link 48, to conduct a privileged conversation. As shown in FIGS. 26 and 27, the communication session interface 34 includes a mode indicator 78 which displays, in real time, the enabled mode of the communication session. Referring to FIG. 26, during a session request portion of the communication session, the client user ("Sally" in the example shown) is communicating with a member receptionist ("George" in the example shown) with the communication session enabled in a non-privileged mode, illustrated by the "Privileged and Confidential Mode" indicator 78 displayed as "OFF." As shown in FIG. 27, after the client user "Sally" is transferred to the attorney member ("Nicole" in the example shown), the attorney member "Nicole" takes an action to transition the communication session to a privileged mode, where the privileged mode may be activated by an input entered to the communication session interface 34 by the attorney member. In one example, the input to transition the mode of the communication session may be an input to a "privileged and confidential" button or icon, which may be configured as a graphical user input (GUI), such as the "Privileged" icon 78 shown in FIG. 28. In another example, the input to transition the mode of the communication session may be included in a communication menu 74 displayed in the communication session interface 34. In one example, both the client user and the attorney member participating in the privileged communication session have access via the communication session interface 34 to an input such that each of these parties can terminate the privileged communication session, by ending the communication session, and/or by entering an input to transition the mode of the communication session from privileged to non-privileged.

Figure 28:
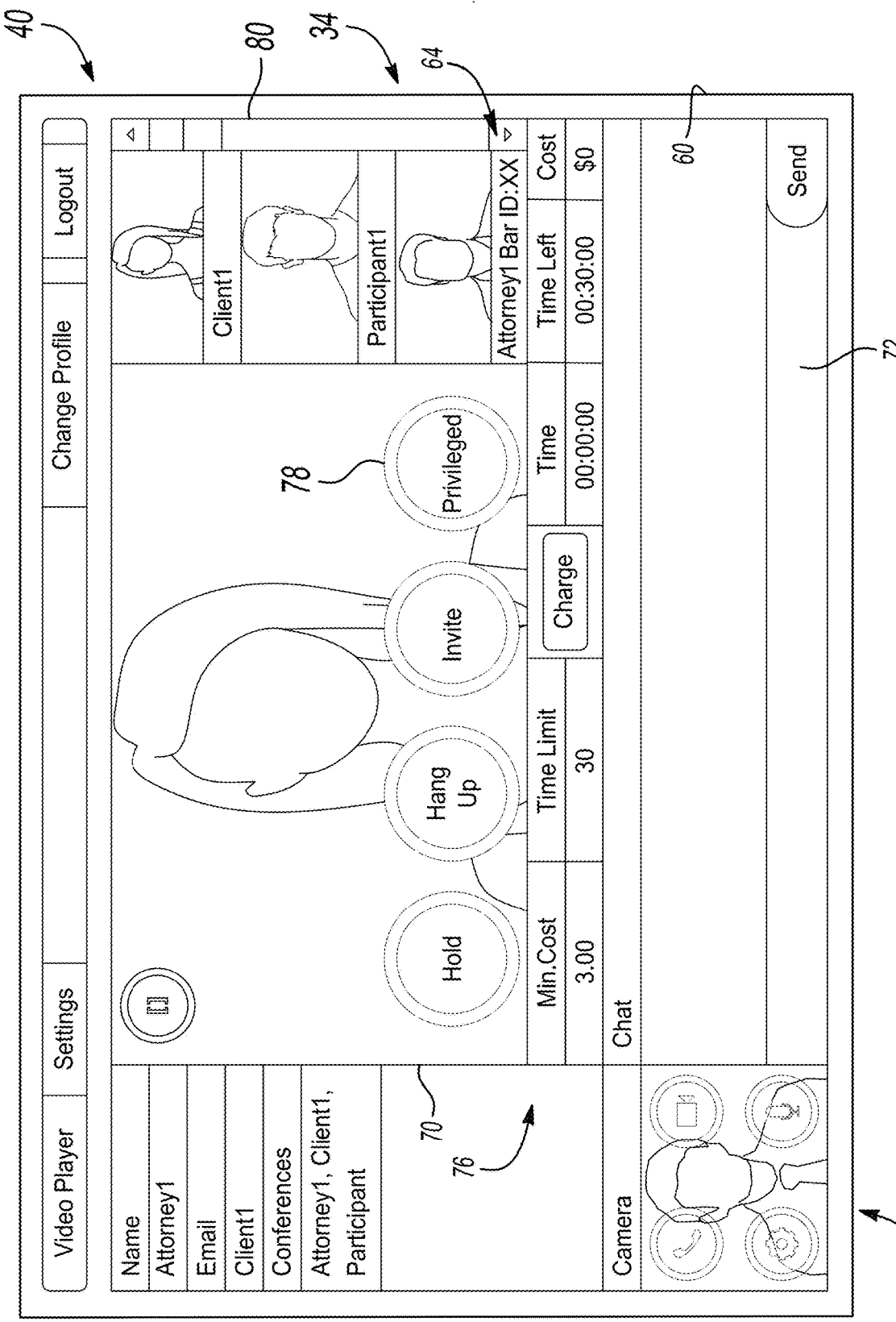

Referring to FIGS. 2, 3, 27 and 28, concurrent with enabling the privileged mode and transitioning the communication session to a secure peer to peer session as shown in FIG. 3, the mode indicator 78 displayed in the communication session interface 34 is transitioned to show, in the example illustrated in FIG. 27, that the Privileged and Confidential Mode is "ON" providing a visual indication to the privileged parties in the conference, e.g., in the present example, to the client user "Sally" and to the attorney member "Nicole", that the communication is a privileged communication, and that the communication is being made outside of the presence of any non-privileged third parties. As previously described, upon enabling the privileged mode and transitioning the communication session to a secure, privileged network link 48 (in one example, a WebRTC protocol peer to peer conference), non-privileged third parties, including, for example, the server 10 and the member receptionist "George" are excluded from and prevented from accessing the communication session in the privileged mode. The example of the mode indicator 78 shown in FIGS. 27 and 28 is non-limiting, such that it would be understood that the mode indicator 78 can be displayed in various configurations, for example, as a watermark prominently displayed within the video/audio interface 72, or as an indicator icon which can be selectively highlighted and/or colored to indicate the mode of the communication session in real time.

Figure 29:
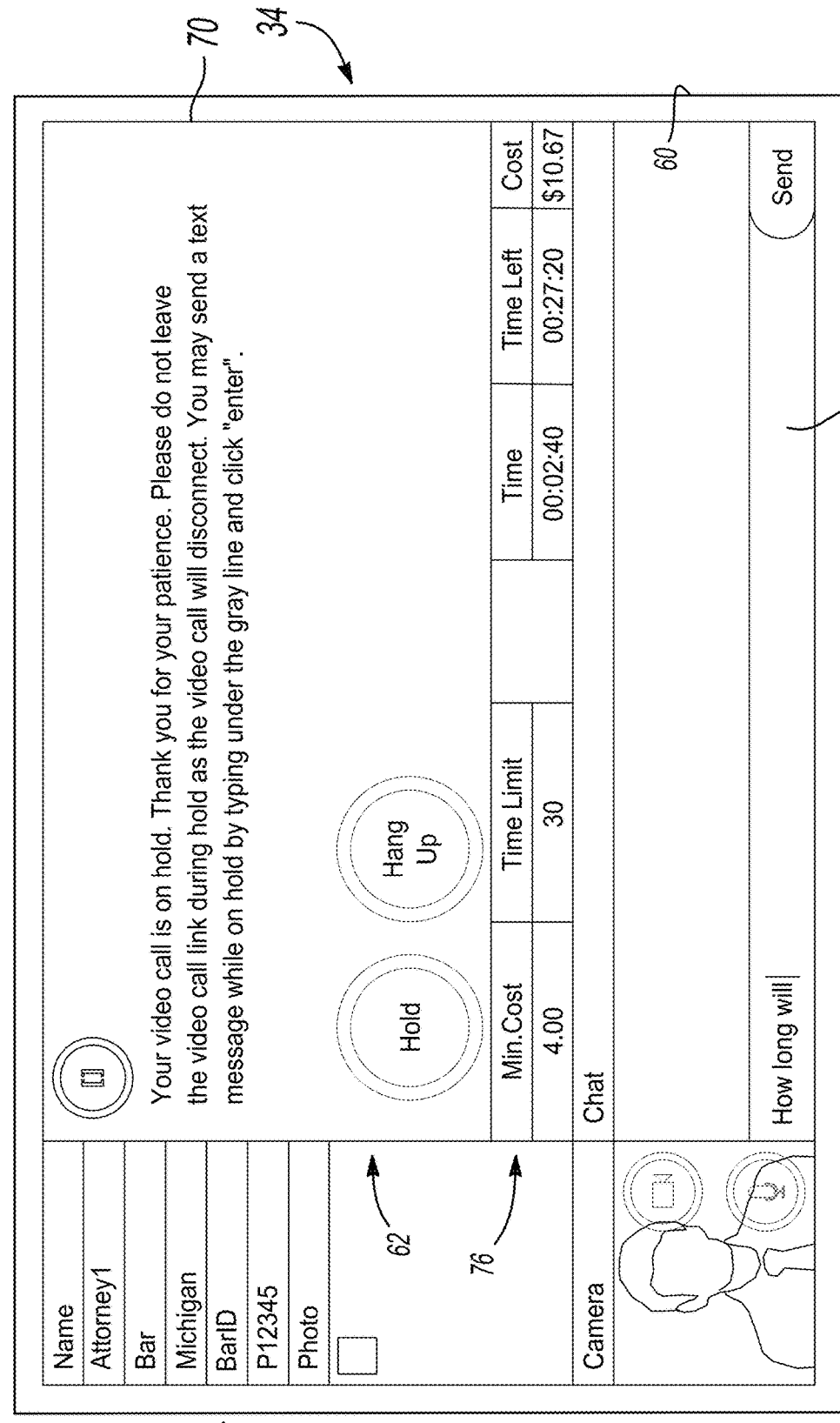

In the illustrative example shown in FIGS. 26 and 27, the communication session interface 34 generated by the communication application 40 and displayed via the attorney website 98, to the client user via the browser 30 and client user computing device 38, and to the attorney member via the attorney computing device 36, can include call tracking information 76 such as the billing rate of the attorney member (see per minute cost indicator shown in FIGS. 28 and 29) or the actual fee to be charged to the client user, which can be a flat rate fee and/or a calculated fee based on the attorney billing rate and an amount of billable time, which can also be included in the call tracking information 76 displayed in the communication session interface 34. In one configuration, the amount of billable time can correspond to the elapsed time of the privileged portion of the communication session, which may be measured, for example, by a timer initiated by the billing module 16 and/or the communication application 40 concurrently with initiating the privileged mode, and ceased concurrently with ending the privileged mode, where upon transitioning from the privileged mode to the non-privileged mode, the communication application 40 transmits the elapsed, billable amount of time to the billing module 16 of the server 10, to initiate a billing action for the communication session, which can include the server 10 and/or communication application 40 transmitting billing information to the payment processor 52, where, as described previously herein, the billing information can include an amount to be billed, billing details including call tracking information, and payor and payee payment information, which may be tokenized such that actual payment information (payor payment account information or payee deposit account information) is not stored by the server 10 or data storage 20 and is not transmitted from the server 10 or data storage 20 via the network 50. As shown in FIGS. 28 and 29, the call tracking information 76 displayed to the communication session interface 34 can include a time limit, and display the time left available in the privileged portion of the communication session based on the time limit. The time limit can be set by the communication application 10, for example, using data and/or information provided by the server 10 and/or received from the data storage 20, which can include, for example, a time limit requested by the client user and/or the attorney member, or a time limit determined by a preauthorized billing amount or retainer associated with the client user and/or defined by the client user's payment information.

As shown in FIGS. 26-29, the communication session interface 34 can include a video/audio interface 70 configured to display the participants in the communication session, where each participant may be identified by a participant identifier 80. In a non-limiting example, the participant identifier 80 displayed in the communication interface 70 for the attorney subscriber can include the attorney credential information 64, for example, the bar identification number (Bar ID #) of the attorney subscriber, and/or an image of the attorney subscriber, for verification of identify and qualification of the attorney subscriber to the client user, and as may be required for compliance with bar association and/or professional liability insurance carrier requirements. In an illustrative example shown in FIG. 29, a scripted message 62 may be displayed in the video/audio interface 70 when the video call is on hold, where placing the video call on hold can deactivate/stop the timer until the video call is removed from hold and/or transitioned into privileged mode. The communication session interface 34 can include a messaging interface 72, such that during the communication session text based messages can be input by and sent between the session participants. Notably, when the communication session is enabled in privileged mode, no facilities or capability is provided to the client user or attorney member to save artifacts of the privileged communication, including, for example, recordings of the audio, visual images, or text messages displayed or transmitted when the communication session is in privileged mode, thus protecting the confidentiality of the privileged information. In an illustrative example shown in FIG. 28, one or more additional participants can be added to the communication session, which can be transitioned between a privileged mode and a non-privileged mode, dependent upon the qualification of the additional participant. For example, where the additional participant qualifies as a privileged person, such as another attorney member or an agent of the attorney member such as a tax accountant, patent agent, etc., and such that the communication between the client user, attorney member and additional participant qualifies as a privileged communication, the communication session is transitioned to and/or conducted in the privileged mode. If for example, the additional participant does not qualify as a privileged person, such as a non-attorney receptionist of the attorney subscriber, then the communication session can be transitioned to and/or conducted in the non-privileged mode. Optionally, the communication session including a non-privileged participant can be conducted with the communication session enabled in the privileged mode, however it would be understood that legal privilege would not be extended to this communication due to the presence of a nonprivileged party in the session, regardless of the mode enabled for the session. This option may be beneficial, for example, where, although legal privilege would not be extended to the communication, the participants may wish to utilize the data security aspects of the privileged mode to prevent recordation of the non-privileged communication by a third party and/or by the server 10.

Figure 9:
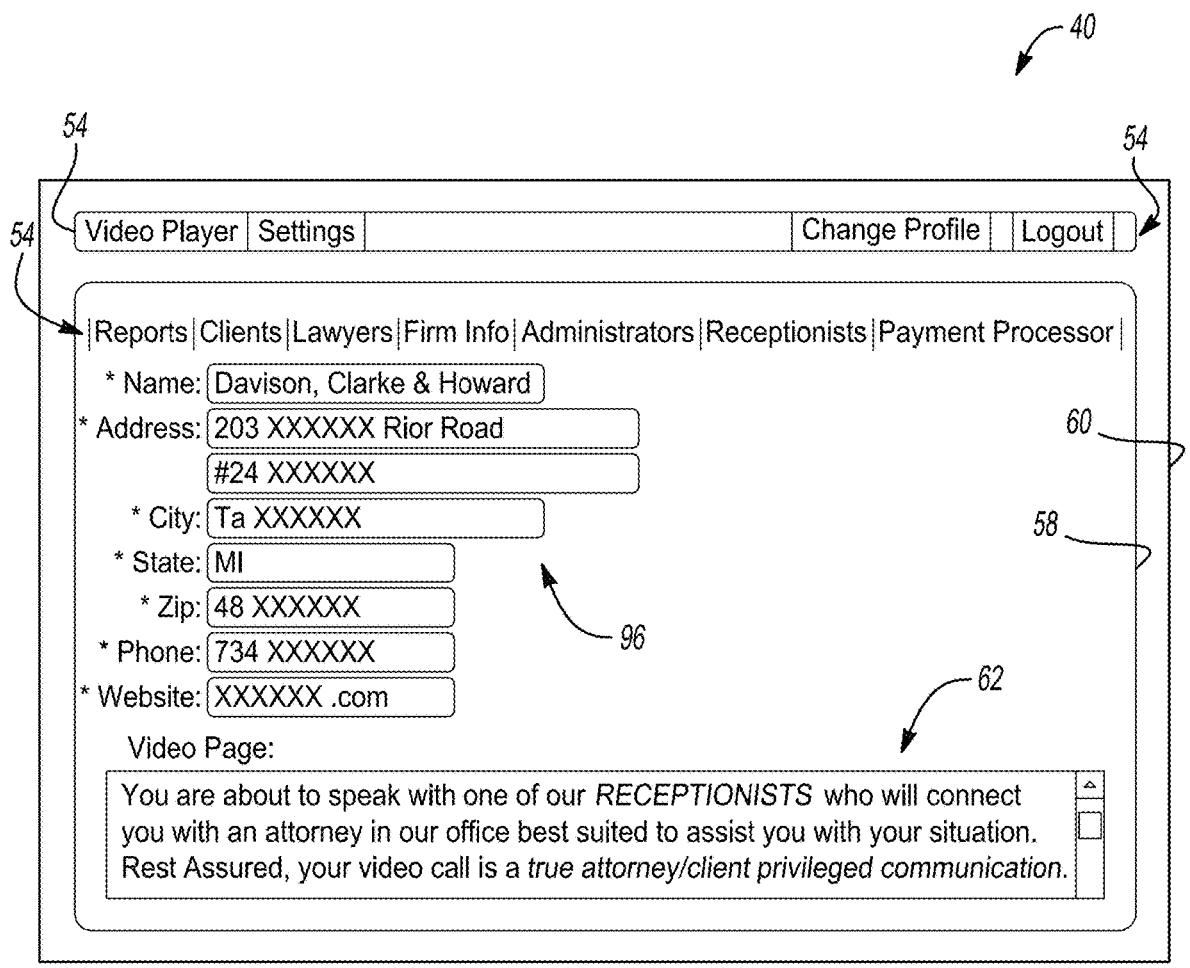
Figure 10:
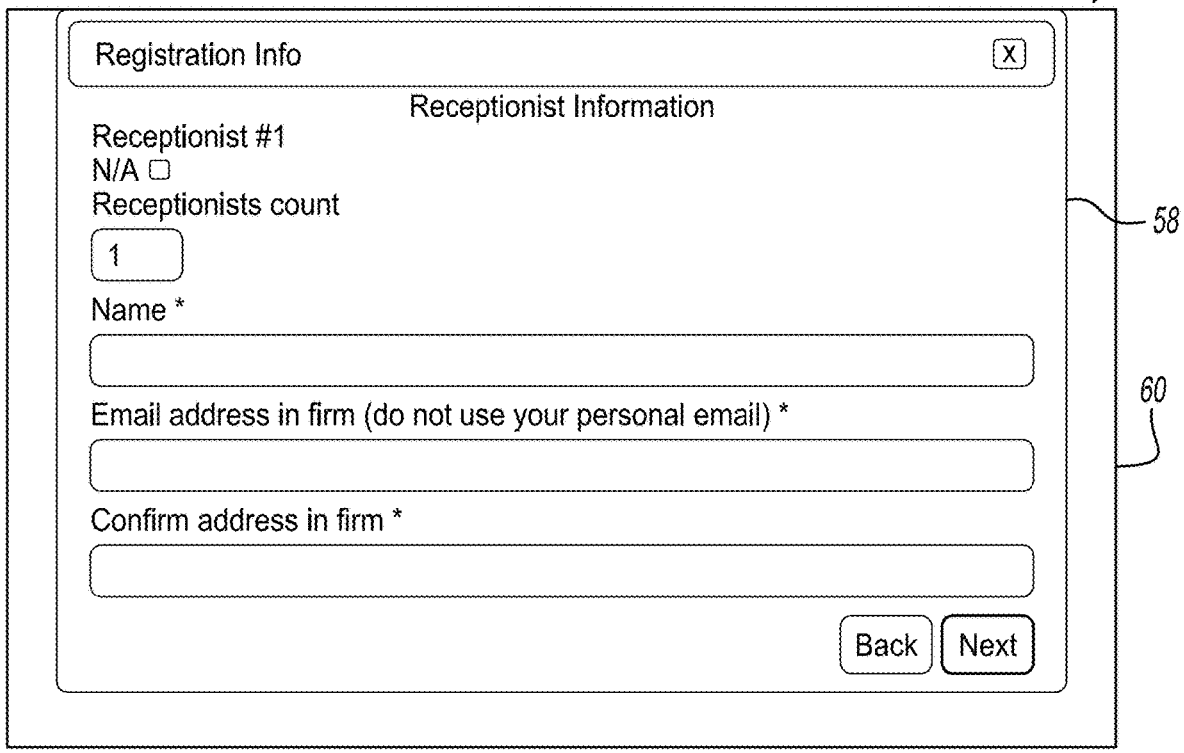
Figure 11:
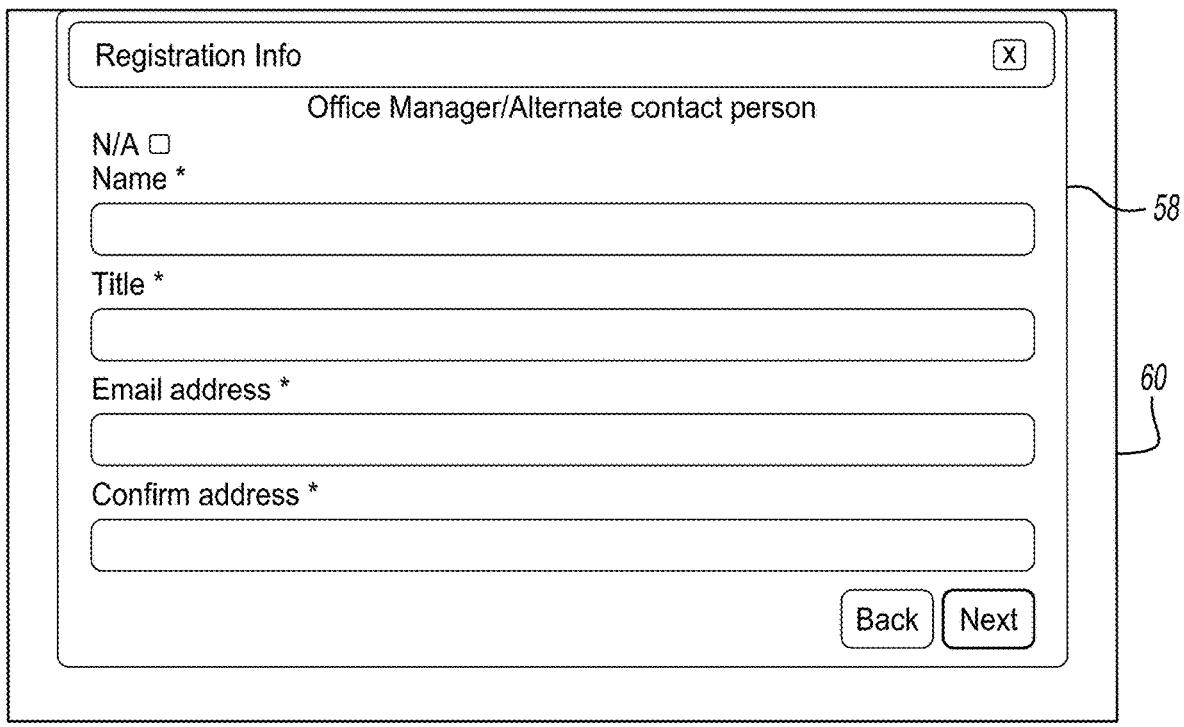

Referring to FIG. 4 and FIGS. 7-21, shown is a method 200 for registering an attorney subscriber to the communication system 100. At step 205, and referring to FIG. 7, the attorney subscriber accesses, via an attorney computing device 36 in communication with the network 50, a user interface 60 generated by the communication application 40 and/or server 10, for example, using an algorithm and/or module 18. The user interface 60 is configured to display, in an illustrative example, a subscriber menu including menu icons labeled "Register" and "Login", each of which can correspond to a graphical user interface (GUI) actuable by input from the attorney subscriber to the user interface 60. In response to an input to the "Register" icon, an attorney subscriber login interface 56 is displayed, into which the attorney subscriber can initially enter an attorney subscriber registration email address and subscriber password to initiate registration of the attorney subscriber to the communication system 100. The attorney subscriber, in the example shown, actuates the "Login" icon in the attorney subscriber login interface 56, and the server 10 stores the attorney subscriber email address and subscriber password in the data storage 20, for example, in the attorney subscriber data store 24. In one example, the attorney subscriber data store 24 includes a plurality of data structures, such as data tables 24(1) . . . 24(N) such that the data store 24 and/or server 10 selects an available data table 24(x) from the plurality of data tables 24(1) . . . 24(N) and stores the attorney subscriber email address and the subscriber to the selected data table 24(x). The attorney subscriber registration method continues at 210, where the server 10 and/or the communication application 40 presents a subscriber input interface into which the attorney subscriber inputs the attorney subscriber's law firm information 96, including, for example, the law firm name, location and/or mailing address, phone number, and law firm website URL which are received by the server 10 and stored to the data store 20, for example, in the selected data table 24(x) such that the law firm information 96 is associated in the data store 20 with the attorney subscriber email address and subscriber password. In the example shown in FIG. 8, the attorney subscriber may be requested to input the number of attorney members which are to be registered to the attorney subscriber, which may be used in structuring the data table 24(x) and/or for administrative purposes. In the example shown in FIG. 9, the subscriber input interface 58 can include one or more fields for the entry of subscriber editable scripts, which may include scripted messages to be displayed within one or more user interfaces 60 generated by the communication application 40, and/or within the communication session interface 34 as shown in the example illustrated by FIG. 29. In the example shown in FIG. 9, at step 210, the attorney subscriber inputs a scripted message for display to a client user accessing the attorney website 98 associated with the attorney subscriber's law firm. The scripted message is associated in the data storage 20 with the attorney subscriber and/or stored to the data table 24(x) associated with the attorney subscriber. The attorney subscriber registration process continues at step 15 and as shown in FIGS. 10-12, with the server 10 and/or the communication application 40 generating one or more subscriber input interfaces 58 into which the attorney subscriber inputs the requested information, which, in the examples shown, can include identifying one or more administrative, e.g., non-attorney members and/or non-privileged members of the attorney subscriber law firm, such as a receptionist, office manager, or other administrative contact person, and an email address associated with each of these. The entered information is stored, in the present example, to the data table 24(x) and associated in the data storage 20 with the attorney subscriber. In one example, the designated role of the non-attorney or non-privileged member may also govern the level of system access or authorization that non-attorney or non-privileged member is assigned within the communication system 100. For example, the receptionist may be granted access to client contact information however may be restricted from accessing client payment information stored to the data storage 20. The office manager may be granted access to both client contact information and client payment information. Other levels of access, authorization to modify, add and/or delete data from the attorney subscriber's data structure 24(x) may be defined based on the identified role of the non-privileged member. In one example, the system 100 may be configured such that only attorney members registered to the system 100 are given permission to transition a communication session from a non-privileged mode to a privileged mode. In one example, the system 100 may be configured such that activation of the privileged mode during a communication session is prevented when the system 100 and/or the communication application 40 detects a non-privileged participant in the communication session.

The method at step 215 can also include assigning a password to the non-privileged member, where the password is associated with the email address of the non-privileged member in the data table 24(x), for use by the communication system 100 and/or server 10 in governing access to the system 100, communication application 40, server 10, and/or to the data storage 20.

At step 220 and referring to the illustrative examples shown in FIGS. 12 and 13, a subscriber input interface is displayed to the attorney subscriber, for registering an attorney member to the communication system 100, where, as previously described herein, an attorney member can be an attorney associated with the attorney subscriber law firm, or other legal advisor or agent of the attorney qualified as a privileged person, e.g., qualified to enter into a privileged communication with a client of the attorney subscriber law firm. The method at step 220 can include assigning a password to the attorney member, where the password is stored and associated with the email address of the attorney member in the data table 24(x), for use by the communication system 100 and/or server 10 in governing access to the system 100, communication application 40, server 10, and/or to the data storage 20. The example is non-limiting and other means of authentication, including, for example, configuring the system 100 for multi-factor authentication of a registered member, such as an attorney member, during log in to the system 100 are anticipated within the scope of the present disclosure.

At step 225, for each attorney member associated with the attorney subscriber, the attorney subscriber and/or the attorney member being registered inputs the requested information, which includes, in the example shown, the name of the attorney member, the email address of the attorney member, and one or more credentials 64 identifying the attorney member as a person qualified to conduct a privileged communication with a client of the attorney subscriber law firm. In the example shown, subscriber input interface 58 requests input of the attorney member's bar identification number and the state bar associated with the bar identification number. In one example, the method 200 and/or communication system 100 can include and/or be configured to verify the credential information 64 entered into the communication system 100 during the registration of the attorney member, and the current status (in good standing, expired, suspended, revoked, etc.) of the credentials of an attorney member with the entity issuing the credential, for example, by verifying the attorney member is admitted as a member of a bar of a state, is registered to practice law before a government office such as the USPTO, is admitted to practice law before a court, etc. By way of non-limiting example, verifying the credential information 64 and/or current status of the credentials of the attorney member can include verifying the current status of the attorney subscriber credentials as related to the respective bar, office, court, etc., by obtaining information from the respective bar, office, court, etc. from which the credential originates, and/or requesting during the registration process, the current status from the attorney member, wherein the request for current status may include requesting an affidavit or declaration from the attorney member attesting to the veracity of the credentials and current status thereof, or other documentation, information, or third party corroboration substantiating the credentials and current status thereof. In one example, the attorney member credentials may be verified at the time of initial registration to the communication system 100. In one example, the attorney member credentials and/or current status of the credentials may be verified periodically after the initial registration, using one or more of the methods discussed previously herein. The method at step 225 can include associating the attorney member's credential information and data verifying the attorney member's credential information with the email address of the attorney member in the data table 24(x), for use by the communication system 100 and/or server 10 in governing access to the system 100, communication application 40, server 10, and/or to the data storage 20.

As previously described, the system 100 may be configured such that only attorney members registered to the system 100 are given permission to transition a communication session from a non-privileged mode to a privileged mode. In one example, the system 100 may be configured such that activation of the privileged mode during a communication session is prevented when the system 100 and/or the communication application 40 detects a non-privileged participant in the communication session. The examples are non-limiting, and other means for preventing participation of non-privileged persons in a communication session when the privileged mode is activated may be used. For example, the application 40 may be designed such that a registered member of the attorney subscriber is only given permission and/or capability to activate the privileged mode after the system 100 and/or the application 40 confirms that verified credentials are stored to and associated with the registered member in the data storage 20, thus confirming that the registered member is a privileged person prior to granting the registered member permission to activate the privileged mode.

Figure 14:
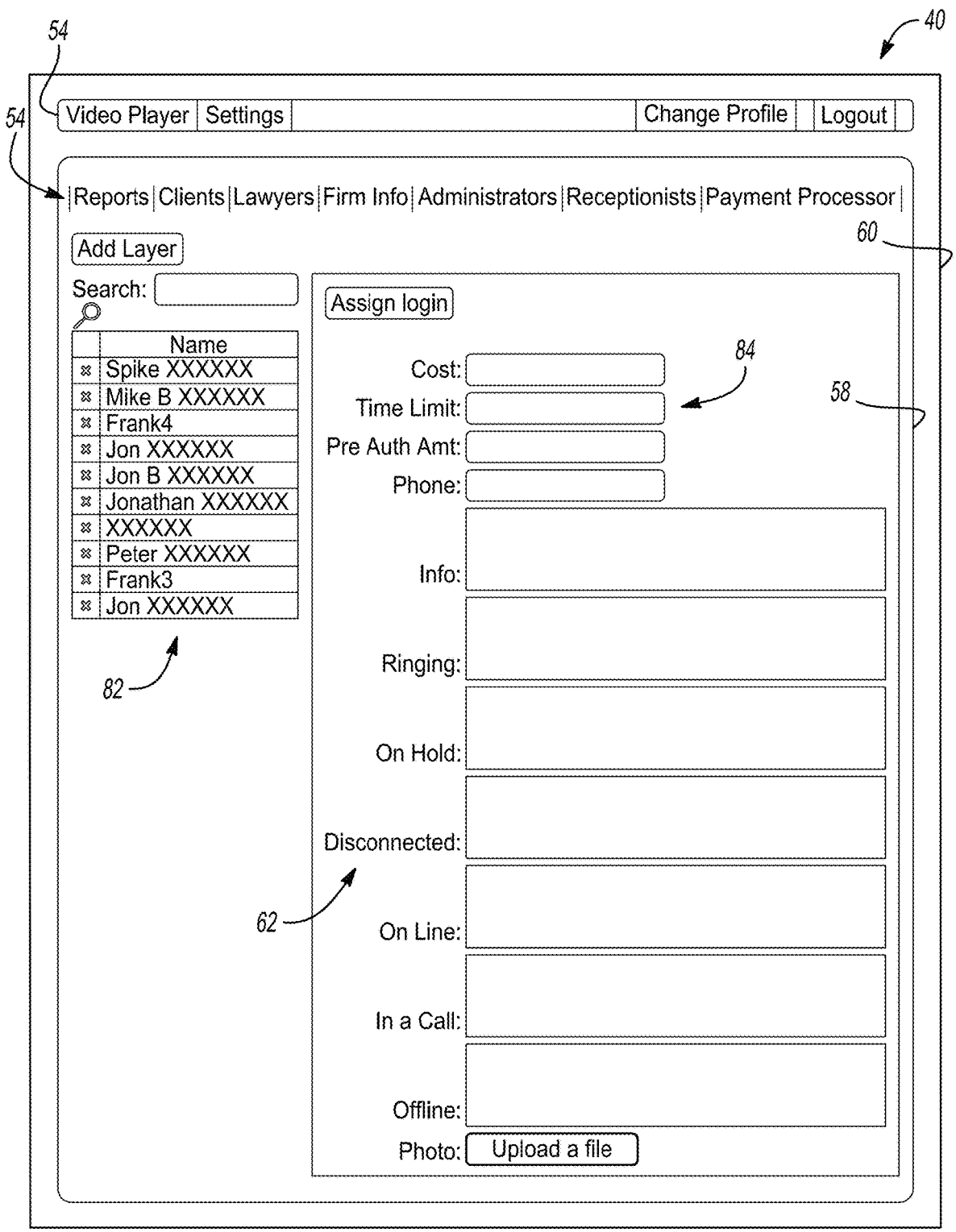
Figure 15:
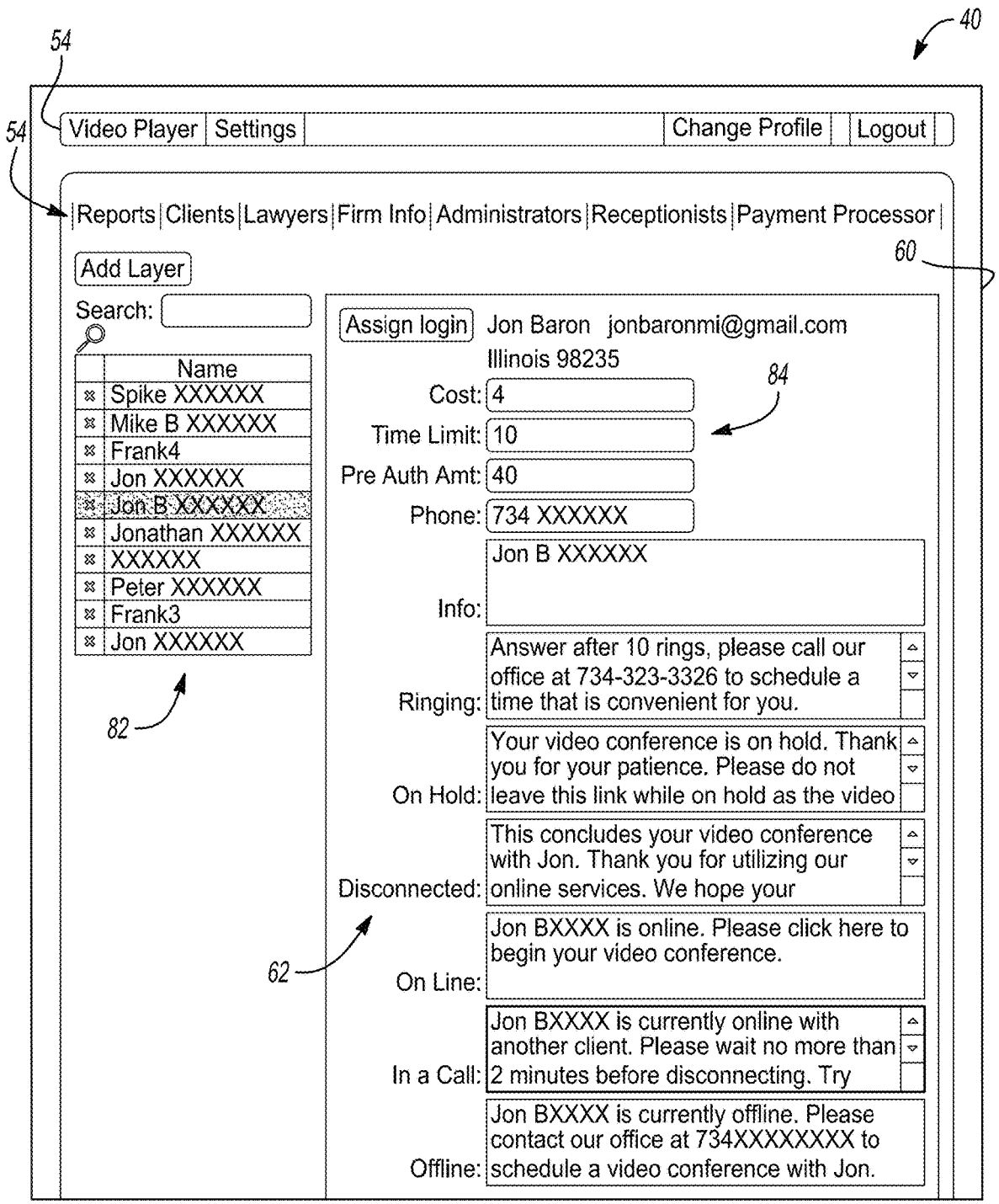
Figure 16:
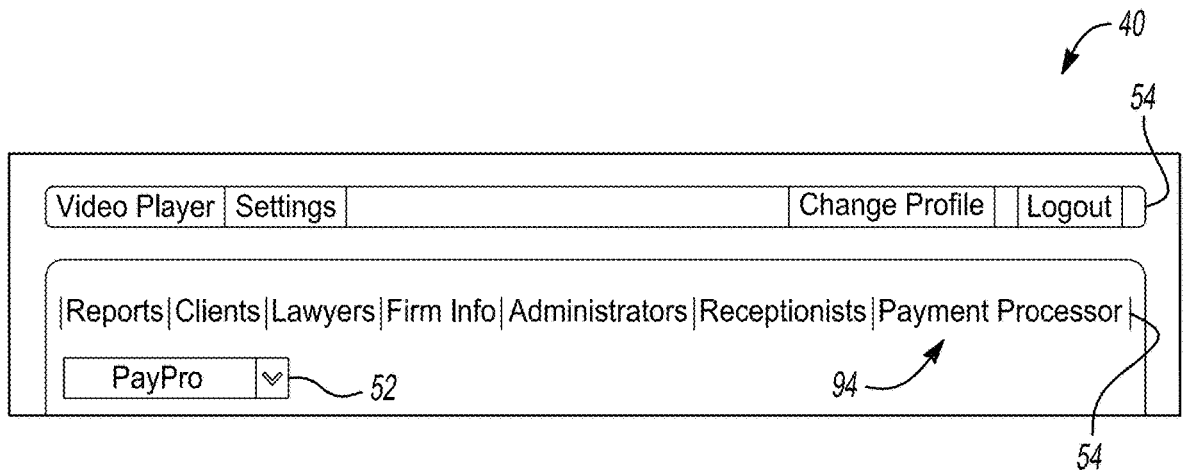

Continuing at step 225, and as shown in FIGS. 14 and 15, attorney billing information 84 and one or more messaging scripts 62 can be entered during the registration process 200 and associated with the attorney member being registered in the data storage 20, for example, in the data table 24(x). The attorney billing information 84 and the messaging scripts 62 are editable in the system 100 by the attorney subscriber, such that these can be updated or revised periodically after registration is completed, if and when updating is required. In an illustrative example, the billing information 84 can include a billing rate and/or other billing information or rules which may be specific to the attorney member being registered.

Each of the messaging scripts 62 can be associated with a call event, such as "Ringing," "On Hold," "Disconnected," "On Line," "Off Line," "In a Call," etc., such that the messaging script 62 entered into the call event field of the subscriber input interface 58 is displayed by the communication application 40 on the communication session interface 34 when the call event occurs. For example, see FIG. 29 showing the messaging script 62 associated with the call event "On Hold" displayed in the communication session interface 34, also displaying the "Hold" icon and a "Hang Up" icon selectable by the client user to terminate the call and communication session.

Steps 220 and 225 of the registration process can be repeated for each attorney member of the attorney subscriber law firm, until registration of all attorney members of the attorney subscriber law firm is completed. The data inputted for each respective attorney member is associated with the respective attorney member in the data storage 20, for example, in the data table 24(x). In one example, the messaging scripts 62 may be identical for all attorney members, or may be customizable, e.g., personalized for the respective attorney member, as determined by the attorney subscriber.

Referring again to FIG. 4, registration of the attorney subscriber continues, in one example, at step 230, where the attorney subscriber can be linked to one or more payment processors 52. As illustrated, step 230 may be optional for an attorney subscriber that does not require or chooses to opt out of this service. For example, an attorney subscriber may opt to receive the billing information and data generated during communication sessions, such as the elapsed time, privileged time, billable time, associated attorney billing rate, etc., of communication sessions conducted with the attorney subscriber from the communication system 100 directly, e.g., from the data storage 20 and/or the server 10 via the billing module 16, such that the attorney subscriber can process a bill to the client user using the attorney subscriber's law firm billing system. In one example, at step 230 and referring to FIG. 16, the attorney subscriber can select one or more payment processors 52 via a payment processor menu element 94 (see FIG. 16) and be registered to the selected payment processor 52. In an illustrative example, the attorney subscriber may be redirected and/or connected directly to selected payment processor 52, in the illustrative example "PayPro," such that the attorney subscriber's payment information including, for example, payee deposit account number(s), deposit institution identification number(s), can be provided directly to the selected payment processor 52. The payment provider 52 can tokenize the attorney subscriber's payment information, e.g., generate a payee token corresponding to the payment information received by the payment provider 52 from the attorney subscriber, and provide the token to the attorney subscriber for input by the attorney subscriber to the billing module 16 during the registration process 200. The payee token is associated with the attorney subscriber in the billing module 16 and/or in data storage 20, and storage, for example, in the data table 24(x) associated with the attorney subscriber. Similarly, during the client user enrollee process 300, the client user can be redirected at 320 to the payment processor 52, to provide payor payment information, such as a bank account number, credit/debit card information, ACH or wire transfer instructions, or alternative/mobile payment information, which is then tokenized by the payment processor 52 to generate a payor token corresponding to the client user's payment information which is then provided to the client user for input to the billing module 16 during the client user's enrollment step 320, and association with the client user in the billing module 15 and/or data storage 20. When processing a bill for a communication session between the attorney subscriber and the client user, the billing module 16 retrieves the payor token associated with the client user and the payee token associated with the attorney subscriber, and transmits the tokens with the payment information for the communication session to be billed to the payment processor 52 to be processed, e.g., for the payment processor 52 to collect payment from the client user's payment account and deposit payment to the attorney subscriber's deposit account, for the convenience of and without further action required by the enrolled client user or the attorney subscriber law firm. In the described example, neither the attorney subscriber's detailed payment information nor the user client's detailed payment information is ever transmitted to the server 10 or stored to the data storage 20, such that compliance to Payment Card Industry Data Security Standards (PCI DSS), or the like, by the server 10, data storage 20 and/or communication application 40 is not required, and the administrative costs and complexity associated with obtaining and maintaining such compliance is avoided.

Figure 19:
Figure 20:
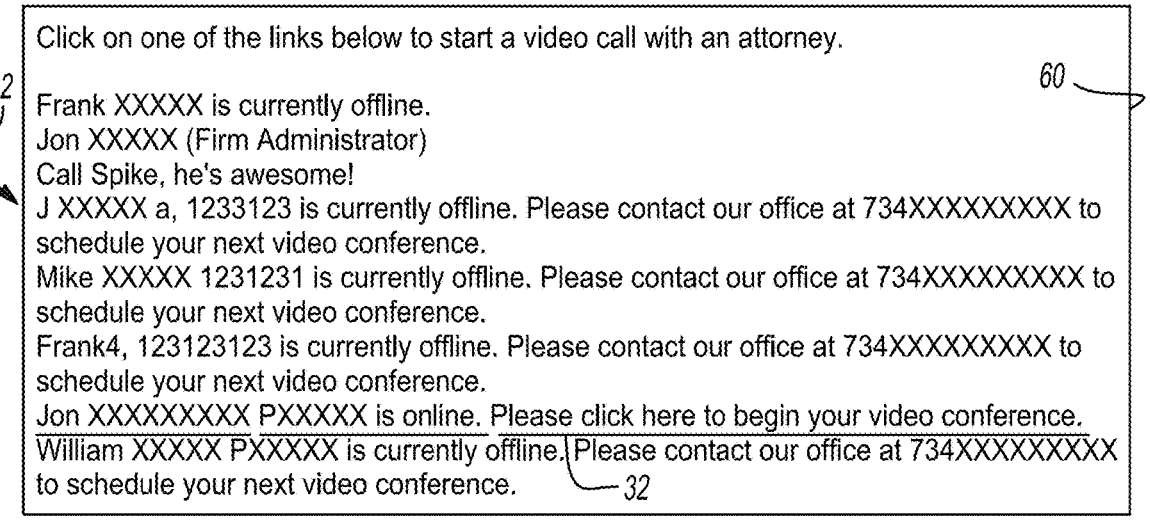
Figure 21:
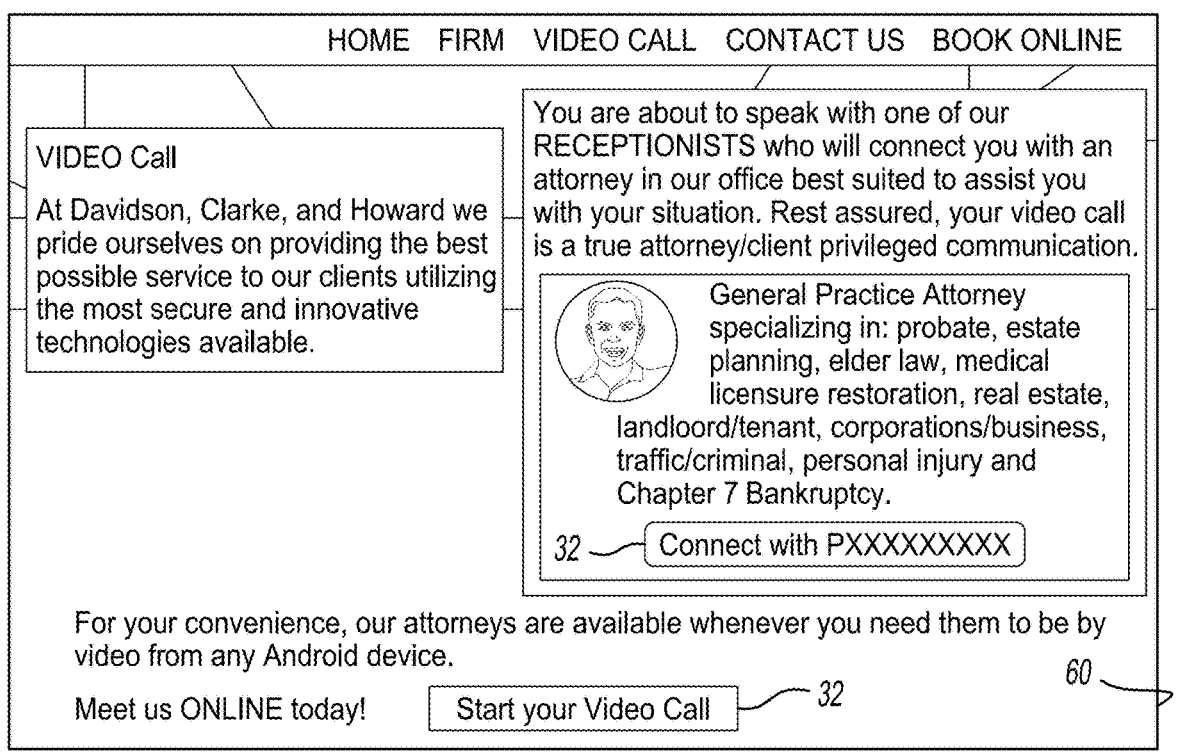

Referring again to FIG. 4, the attorney subscriber registration process 200 can include, at 235, installing a call request interface 32 to the law firm attorney website 98 of the attorney subscriber, as shown in FIGS. 19 and 21, for use by a client user to request a communication session. In one example, the call request interface 32 can be linked to an attorney member listing 82, as shown in FIG. 20, such that in response to an input by the client user to the call request interface 32, in one example, the communication application 40 displays the attorney member listing 82 such that in response to an input by the client user to a hyperlink 32 associated with the member attorney selected from the listing 82 by the client user, the communication application 40 initiates a communication session between the client user and the selected attorney member via a communication session interface 34. In another example, in response to an input by the client user to the call request interface 32, the communication application 40 initiates a communication session between the client user and a receptionist of the attorney subscriber, via a communication session interface 34 as shown in FIG. 26.

Figures 7, 8:
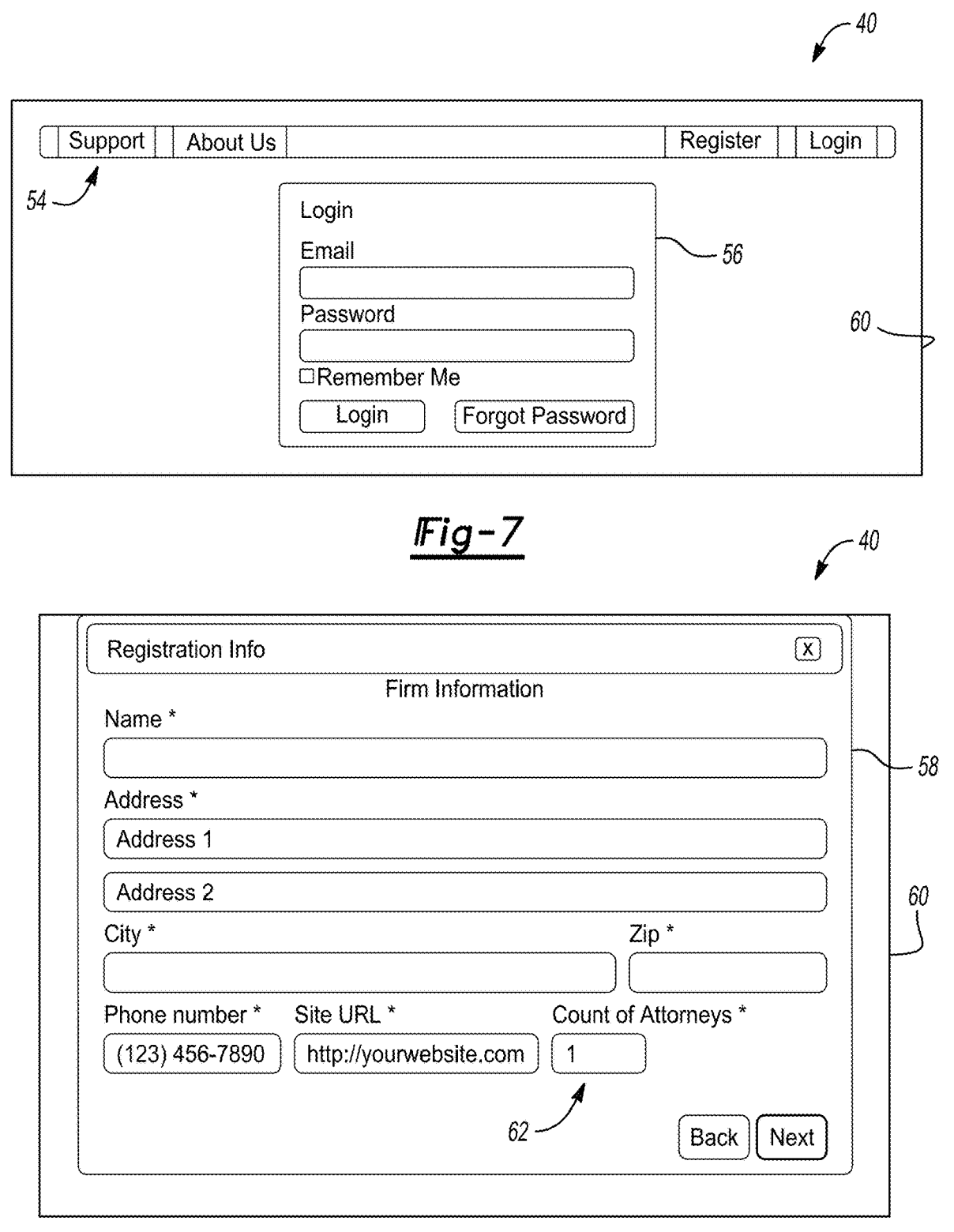
Figure 22:
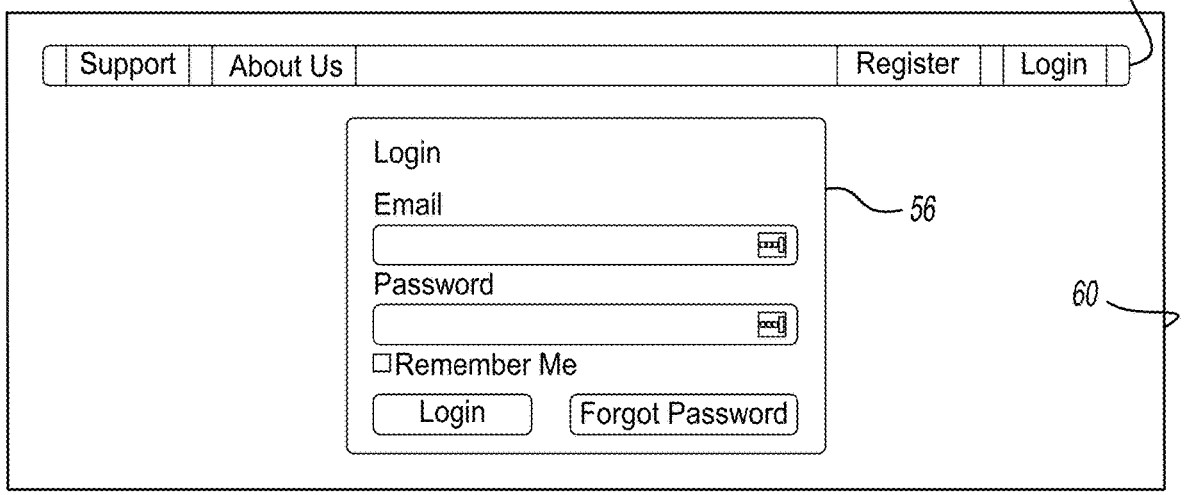
Figure 23:
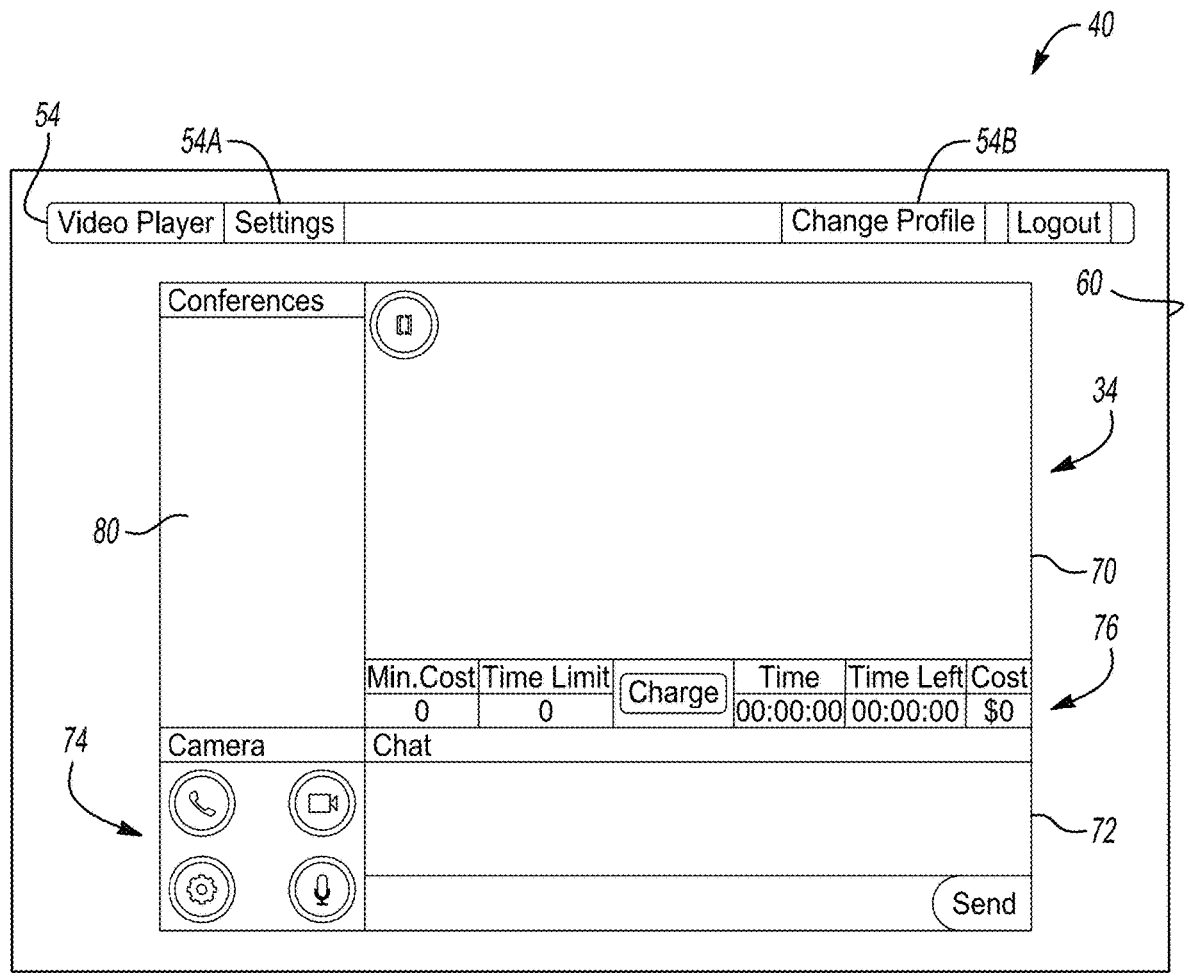
Figure 24:
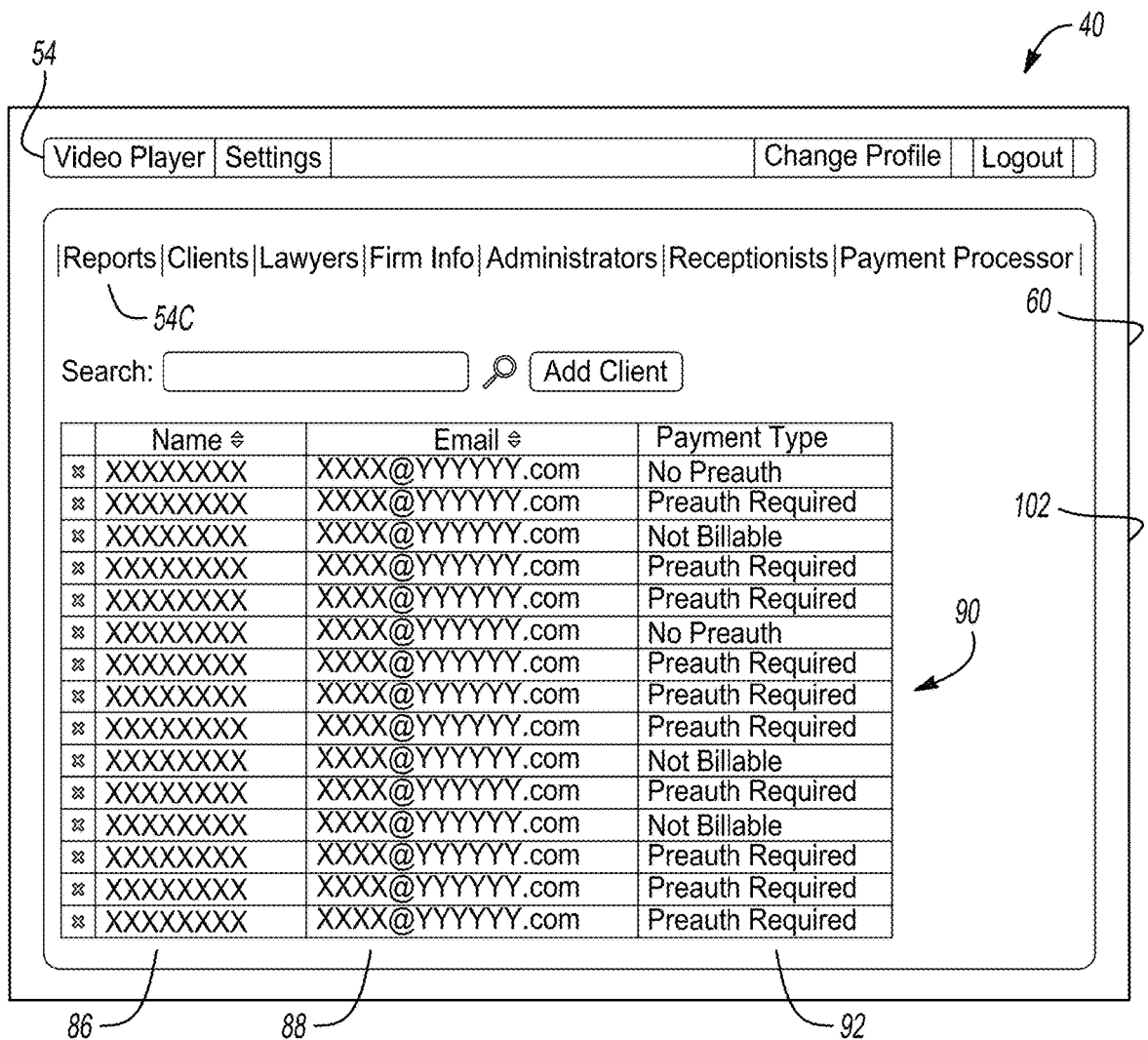
Figure 25:
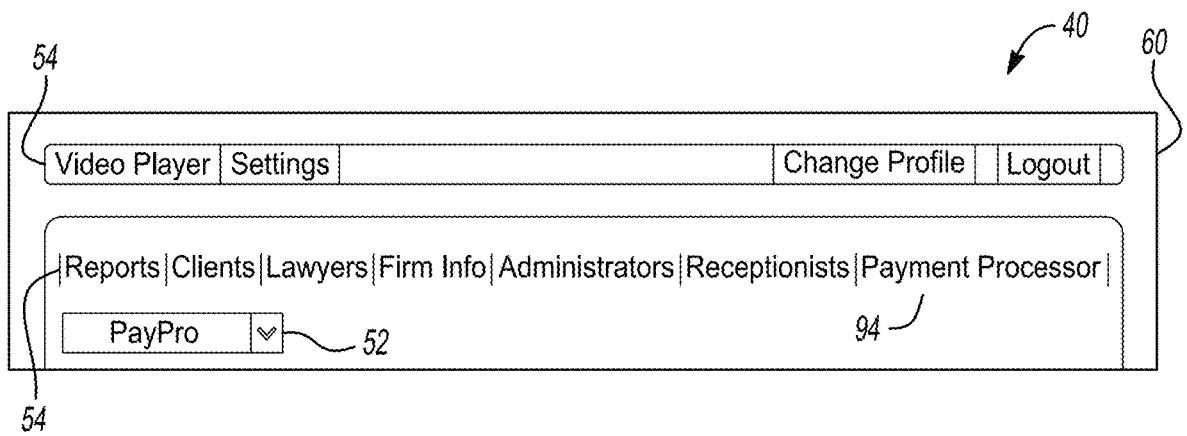

After completing the registration process 200, the attorney subscriber including registration of each of the non-attorney members and attorney members associated with the attorney subscriber, the non-attorney members attorney members can access the communication application 40 via the subscriber login interface 56, as shown in FIGS. 7 and 22. In an illustrative example, the communication system 100 and/or communication application 40, upon authentication of the attorney member's log in information, revises the attorney member's status in the attorney listing 82 as "On Line" or "Available" to indicate to a client user the attorney member is logged into the communication system 100. In one example, upon authentication of the member's log in information, the communication application 40 displays to the member the communication session interface 34, as shown in FIG. 23, including a menu 54 from which the logged in member can select, for example, menu element 54A "Settings" to display an administrative interface 102 shown in FIG. 24, menu element 54B "Change Profile" to display editable profile information (see FIG. 15), or to return to the video player interface from the settings or profile screens, can select the "VideoPlayer" menu element. As shown in FIG. 24, the administrative interface 102 includes a settings menu 54C with links to various administrative functions, including, for example, Reports, Clients, Lawyers, Firm Information, Administrators, Receptionists, and Payment Processor, where one or more of menu links may be accessible depending on the member's authority level or role identified to the communication system 100 during the registration process 200. For example, access to the Payment Processor interface 94 (FIG. 25) may be limited to law firm management members, accounting members, and/or attorney members.

In an illustrative example, selecting the menu element "Clients" displays a client listing 90 of client users associated with the attorney subscriber. In a non-limiting example, the client listing 90 can include the client name 86, contact information 88, and a payment type indicator 92, such as "Preauthorization Required" indicating the client must provide payment information prior to conducting a communication session with a member attorney, "No Preauthorization" indicating the client is not required to provide payment information prior to participating in a communication session with a member attorney, "Not billable" for example, for a pro bono client, etc. In one example, the client listing may also be used for other professionals, such as CPA's Financial Advisors, psychologists, translators, etc., such that these other professionals are enrolled in the communication system to enable participation as required in a communication session with an attorney member and/or a client user, which can include, as illustrated in FIG. 28, joining a communication session as an additional participant, where the communication session may be conducted in a privileged mode when the additional participant is qualified as a "privileged" person.

As shown in FIG. 5, a method 300 for enrolling a client user to the communication system 100 includes, at 305, the client user accessing the communication application 40 via the attorney website 98, via a browser 30 accessed via the client user's computing device 38 in communication with the network 50 (see FIGS. 1 and 2). At 310, the client user initiates the enrollment process and/or request for a communication session by providing an input to a call request interface 32 displayed on the attorney website 98, which, for example, can be a centralized website such as the "ConnectTMA" website shown in FIG. 17, or a law firm website of an attorney subscriber, such as the "Davison, Clarke & Howard" website shown in FIG. 19. The communication application 40 at step 315 of the enrollment process displays a client enrollment interface 66 via the attorney website 98 to the client for input by the client user of client information. In an illustrative example, the client user may be prompted by the client enrollment interface 66 to input the client user's information including the client name 86, the client email address or other contact information 88, etc. The inputted client information is transmitted to the server 10 via the network 50, for storage of the client information in the data storage 20, for example, in the client user data store 26. In one example, the client user data store 26 includes a plurality of data structures, such as data tables 26(1) . . . 26(N) such that the data store 26 and/or server 10 selects an available data table 26(x) from the plurality of data tables 26(1) . . . 26(N) and stores the client information to the selected data table 26(x).

The client may be requested, at 320, to input payment information at the time of enrollment, or may be requested to input payment information at a later time, for example, after selecting and/or confirming the availability of an attorney member for a communication session. As previously described, at 320 the client may be redirected at 320 to the payment processor 52, to provide payor payment information, such as a bank account number, credit/debit card information, ACH or wire transfer instructions, or alternative/mobile payment information, which is then tokenized by the payment processor 52 to generate a payor token corresponding to the client user's payment information which is then provided to the client user for input to the billing module 16 during the client user's enrollment step 320, and association with the client user in the billing module 15 and/or data storage 20, for example, for storage to the data table 26(x) associated with the client user being enrolled.

Figure 6:
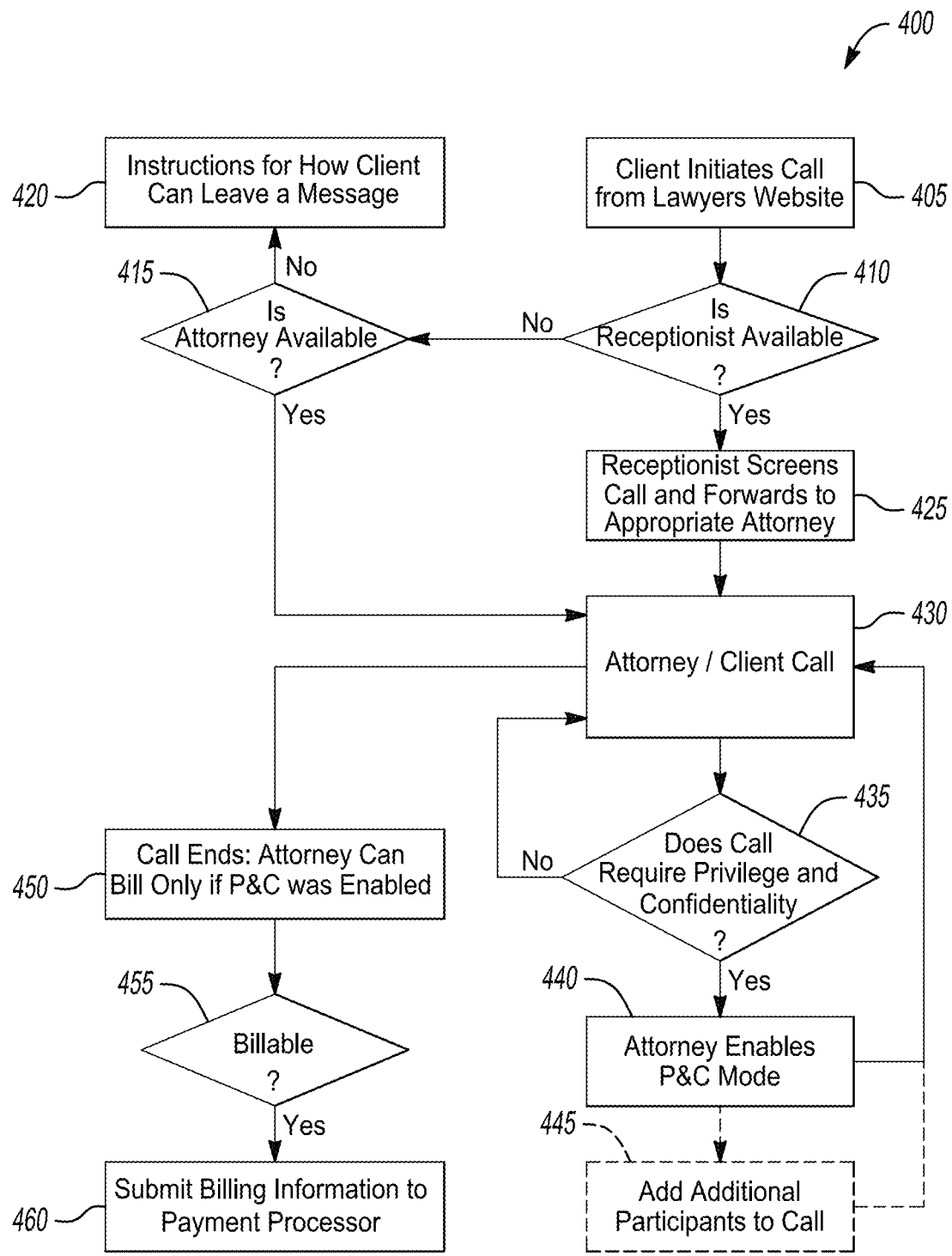
FIG. 6 is a schematic flowchart describing a method for conducting a communication session between a client user and attorney subscriber using the communication system and communication application of FIG. 1.

The method 300 continues at 325, with the client user selecting an attorney subscriber and/or an attorney member of the attorney subscriber and requesting a communication session. The example is non-limiting, and it would be understood that the order of the steps may be changed without departing from the scope of the present disclosure. For example, referring to FIG. 6, shown is a method of conducting a communication session between a client user and an attorney member of an attorney subscriber, which begins, in the illustrated example, the client user at 405 initiating the call, e.g., the communication session, by accessing the communication application 40 from the attorney website 98 via the client user computing device 38, web browser 30 and network 50. In one example, the client user may be enrolled to the communication system 100 as described by method 300 prior to initiating step 405 shown in FIG. 6, for example, where the client user is an existing client of the attorney subscriber, or otherwise previously enrolled in the communication system 100. In one example, the communication application 40 and/or the attorney website 98 and call request interface 32 may be configured such that the client user is requested to perform the enrollment process 300 at a later point in the method 400, for example, after communicating with the receptionist at 425 and/or after availability of the selected attorney member is confirmed, thereby precluding the need for the client user to enter personal information, including payment information, into the communication system 100, for example, at a time when the attorney member is not available for a communication session.

Referring again to FIG. 6, the process 400 continues with the communication application 40 determining at 410 whether a receptionist member of the attorney subscriber is available, e.g., the attorney subscriber has enabled the receptionist function. If a receptionist function is available and the receptionist member is on line, the communication application 40 connects the client user to the receptionist member via the communication session interface 34, as shown in FIG. 26. At 425, the receptionist member greets the client user and facilitates establishing the communication session between the client user and the attorney member, which can include, for example, one or more of collecting client information from the client user, assisting the client user to select an attorney member based on the client user's needs, determining the on line availability of the selected attorney member, establishing an appointment time for the communication session if the selected attorney member is not currently available, etc. The receptionist member at 430, provides input to the communication session interface 32, for example, via the communication menu 74, to connect client user to the selected attorney member in a communication session via the communication session interface 34, as shown in FIG. 27.

If at 410 a receptionist is not available, the method proceeds to 415, where, for example, the communication application 40 can display an attorney member listing 82 from which the client user can select an attorney member, for example, by selecting a hyperlink 32 associated with the attorney member's name. If the attorney is on line and available, the method proceeds to 430, and the communication application 40 connects the client user to the selected attorney member in a communication session via the communication session interface 34. If the selected attorney is not available, the method proceeds to 420, where the communication application 40 provides instructions for how the client can leave a message, for example, via the messaging interface 72. In one example shown in FIG. 29, where the attorney member is on line however not available, the communication application 40 may place the communication session into a "On Hold" condition and display a scripted message 62 associated with the attorney member. The client user, via the communication session interface 34 is provided options, in the illustrative example, including messaging via the messaging interface 72, remaining on hold, and/or terminating the communication session by providing an input to the "Hang Up" icon displayed to the client user.

At 430, and as shown in FIGS. 26 and 27, during the communication session, the interaction between the participants can occur via a video/audio interface 70 and/or via a messaging interface 72. In one example, the communication system 100 and/or communication application 40 is configured to display, in the messaging interface 72, captioning of the conversation between the client user and attorney member, as shown in FIGS. 26 and 27, for the convenience of the participants and/or for accessibility, for example, to assist those with hearing disabilities, etc.

At 435, if a determination that a privileged and confidential communication between the attorney member and the client user is required, the method proceeds to 440, with the attorney member enabling the privileged mode, for example, by an input to the communication session interface 34 via the communication menu 74 or an icon or other input provided for that purpose. When enabled in privileged mode, the communication application 40 displays a mode indicator 78, indicating to the participants that the communication session has been transitioned to privileged mode. Non-limiting examples of the mode indicator 78 are shown in FIG. 26, and may be configured as a text as shown in FIGS. 26 and 27, indicating the Privileged and Confidential Mode is "ON" or "OFF" or by selectively highlighting, coloring, or otherwise actuating an icon, as shown in FIG. 28, to indicate the privileged mode is activated. In one example, one or more of an image of the attorney member, the attorney's name, the law firm name, and/or the attorney subscriber's credential information 64, such as the attorney's bar identification number, can be displayed in the session interface 34 to all participants, to indicate the attorney member is a person qualified to conduct a privileged communication with a client user, and/or to comply with bar association and/or insurance carrier requirements for the practice of law online. In one example, a watermark can be displayed in or across the communication session interface 34 to all participants, to indicate the mode of the session as either "privileged" or "non-privileged." Referring again to FIG. 6, at step 440, the communication application 40 and/or the communication system 100 transitions the communication session to the privileged mode by connecting the privileged participants, e.g., the attorney member and the user client, via a peer-to-peer connection 48 (see FIGS. 1 and 3) for example, using WebRTC protocol, such that non-privileged parties are excluded from the connection 48 between the attorney member and the client member. The privileged connection 48 is encrypted, for example, using TLS, and no records of data sent over the privileged channel 48 are kept or stored. Specifically, the server 10 and the data store 20 do not maintain records of the privileged portion of the communication session, e.g., the portion of the communication session occurring when the privileged mode is enabled, nor does the server 10 or the data store 20 have access to any content created by the conference session while in privileged mode. In one example, at step 445 and as shown in FIG. 28, one or more additional participants can be added to the conference session while in privileged mode, for example, via inputs entered through the communication menu 74, while the conference session is enabled in the privileged mode, such that the additional privileged participant is connected to the attorney member and client member via the privileged connection 48 to the exclusion of any third parties, and such that neither the server 10 nor the data storage 20 has access the privileged content of the conference session nor has the capability to maintain records of the conference in privileged mode.

As shown in FIGS. 26-29, during the communication session additional information can be presented to the participants to the communication session via the communication session interface 34, including, for example, call tracking information 76, such that the participants to the communication session, including the client user, can view information such as the elapsed time of the communication session, the amount of billing time, the billing rate of the attorney member, a calculated billable cost of the communication session, each displayed in real time, and such that the client user is aware of the costs being incurred for conducting the communication session. In one example, the communication application 40 and/or the billing module 16 is configured such that billable time is accrued only during the elapsed time that the privileged mode is activated, e.g., the client user is not billed for administrative time or for non-privileged time. Referring to FIG. 6, at 450 the communication session, or the privileged portion thereof, can be terminated by an action taken by the attorney member or the client user. In one example, the communication session can be terminated at 450 by either the attorney member or the client user activating a "Hang Up" interface displayed to the communication session interface 34 (see FIGS. 28 and 29), or by the attorney member terminating the communication session, for example, by actuating a termination command via the communication menu 74. Upon detecting a termination command, the communication application 40 deactivates the timer, for example, via a command sent to the billing module 16, and the elapsed billable time and related call tracking information 76 is stored to the data storage 20, for use in processing a bill for the communication session to the client user. In one example, the attorney member can deactivate the privileged mode, to transition the communication session to the non-privileged mode, where deactivating the privileged mode initiates a command from the communication application 40 to deactivate the timer, as described above, and to store the elapsed billable time and related call tracking information 76 to the data store, where it is associated in the data store with one or more of the client user, the attorney member, and the communication session event, for use by the billing module 16 in processing billing for the communication session. Processing billing for the communication session can include, as shown in FIG. 6, determining at 455, via the server 10 and/or billing module 16, if billable time has been accrued during the communication session, and if so, processing a bill for the communication session by submitting at 460 billing information to a payment processor 52, and/or submitting billing information to the attorney subscriber law firm, for processing of the bill via the law firm's billing system.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed is:

1. A computer-implemented method for conducting a privileged communication session between a client user and an attorney subscriber, the method comprising:
    accessing, via a network, a communication application having a corresponding communication server;
    wherein the communication server comprises a memory and a processor;
    wherein the communication application is accessed by a client user computing device in communication with the network;
    wherein the communication application is accessed by an attorney subscriber computing device in communication with the network;
    inputting, via the client user computing device and the communication application, a communication session request to the attorney subscriber computing device;
    initiating a communication session between the client user computing device and the attorney subscriber computing device in response to the communication session request, via the communication application;
    wherein the communication session is configured to be selectively conducted via the communication application in a non-privileged mode and in a privileged mode;
    wherein in the non-privileged mode, the communication session is conducted via the communication server in communication with the client user computing device and the attorney subscriber computing device;
    wherein in the privileged mode the communication session is conducted via a direct communication link initiated via the communication application such that, in the privileged mode:
        the communication session is conducted between the client user computing device and the attorney subscriber computing device via the direct communication link; and
        the communication server is disconnected from the direct communication link;
    the method further comprising:
        enrolling the client user to the communication application, including:
            inputting client user enrollment information via the communication application;
            receiving the client user enrollment information to the communication server; and
            storing the client user enrollment information in a data storage in communication with the communication server;
        wherein the client user enrollment information includes payor payment information, the method further comprising:
    associating payor payment information with the client user in the data storage.

2. A computer-implemented method for conducting a privileged communication session between a client user and an attorney subscriber, the method comprising:
    accessing, via a network, a communication application having a corresponding communication server;
    wherein the communication server comprises a memory and a processor;
    wherein the communication application is accessed by a client user computing device in communication with the network;
    wherein the communication application is accessed by an attorney subscriber computing device in communication with the network;
    inputting, via the client user computing device and the communication application, a communication session request to the attorney subscriber computing device;
    initiating a communication session between the client user computing device and the attorney subscriber computing device in response to the communication session request, via the communication application;
    wherein the communication session is configured to be selectively conducted via the communication application in a non-privileged mode and in a privileged mode;
    wherein in the non-privileged mode, the communication session is conducted via the communication server in communication with the client user computing device and the attorney subscriber computing device;
    wherein in the privileged mode the communication session is conducted via a direct communication link initiated via the communication application such that, in the privileged mode:
        the communication session is conducted between the client user computing device and the attorney subscriber computing device via the direct communication link; and
        the communication server is disconnected from the direct communication link;
    the method further comprising:
        enrolling the client user to the communication application, including:
            inputting client user enrollment information via the communication application;
            receiving the client user enrollment information to the communication server; and
            storing the client user enrollment information in a data storage in communication with the communication server;
    wherein inputting client user enrollment information via the communication application further comprises:
    providing payor payment information to a payment processor via the communication application;
    generating, via the payment processor, a payor token associated with the payor payment information;
    wherein the client user enrollment information includes the payor token; and
    associating the payor token with the client user in the data storage.

3. A computer-implemented method for conducting a privileged communication session between a client user and an attorney subscriber, the method comprising:
    accessing, via a network, a communication application having a corresponding communication server;
    wherein the communication server comprises a memory and a processor;
    wherein the communication application is accessed by a client user computing device in communication with the network;
    wherein the communication application is accessed by an attorney subscriber computing device in communication with the network;
    inputting, via the client user computing device and the communication application, a communication session request to the attorney subscriber computing device;
    initiating a communication session between the client user computing device and the attorney subscriber computing device in response to the communication session request, via the communication application;
    wherein the communication session is configured to be selectively conducted via the communication application in a non-privileged mode and in a privileged mode;

wherein in the non-privileged mode, the communication session is conducted via the communication server in communication with the client user computing device and the attorney subscriber computing device;

wherein in the privileged mode the communication session is conducted via a direct communication link initiated via the communication application such that, in the privileged mode:

the communication session is conducted between the client user computing device and the attorney subscriber computing device via the direct communication link; and the communication server is disconnected from the direct communication link;

the method further comprising:

registering the attorney subscriber to the communication system, including:

inputting attorney subscriber registration information via the communication application;

receiving the attorney subscriber registration information to the communication server; and storing the attorney subscriber registration information in a data storage in communication with the communication server;

registering the attorney subscriber to the communication system, including:

inputting attorney subscriber registration information via the communication application;

receiving the attorney subscriber registration information to the communication server; and storing the attorney subscriber registration information in a data storage in communication with the communication server;

wherein:

the attorney subscriber includes an attorney member; and the registration information includes attorney credential information corresponding to the attorney member;

the method further comprising:

associating the attorney credential information with the attorney member in the data storage.

4. The method of claim 1, further comprising:
verifying a status of the attorney credential information of the attorney member; and
associating the verified status with the attorney credential information in the data storage.

5. The method of claim 4, further comprising:
periodically reverifying the status of the attorney credential information of the attorney member; and
revoking the verified status when the attorney credential cannot be reverified.

6. A computer-implemented system for conducting a privileged communication between a client user and an attorney subscriber, the system comprising:

a communication application having a corresponding communication server;

the communication server including a processor and a memory;

a client user computing device configured to access the communication application via a network;

an attorney subscriber computing device configured to access the communication application via the network; and wherein the communication application and the communication server are respectively configured to execute a method comprising:

accessing the communication application via the client user computing device;

accessing the communication application via the attorney subscriber computing device;

inputting, via the client user computing device and the communication application, a communication session request to the attorney subscriber computing device;

initiating a communication session between the client user computing device and the attorney subscriber computing device in response to the communication session request, via the communication application;

wherein the communication session is configured to be selectively conducted via the communication application in a non-privileged mode and in a privileged mode;

wherein in the non-privileged mode, the communication session is conducted via the communication server in communication with the client user computing device and the attorney subscriber computing device;

wherein in the privileged mode the communication session is conducted via a direct communication link initiated via the communication application such that, in the privileged mode:

the communication session is conducted between the client user computing device and the attorney subscriber computing device via the direct communication link; and the communication server is disconnected from the direct communication link the communication application and communication server respectively configured to execute the method further comprising:

enrolling the client user to the communication application, including:

inputting client user enrollment information via the communication application;

receiving the client user enrollment information to the communication server; and storing the client user enrollment information in a data storage in communication with the communication server;

wherein inputting client user enrollment information via the communication application further comprises:

providing payor payment information to a payment processor via the communication application;

generating, via the payment processor, a payor token associated with the payor payment information;

wherein the client user enrollment information includes the payor token; and associating the payor token with the client user in the data storage.

7. A computer-implemented system for conducting a privileged communication between a client user and an attorney subscriber, the system comprising:

a communication application having a corresponding communication server;

the communication server including a processor and a memory;

a client user computing device configured to access the communication application via a network;

an attorney subscriber computing device configured to access the communication application via the network; and wherein the communication application and the communication server are respectively configured to execute a method comprising:

accessing the communication application via the client user computing device;

accessing the communication application via the attorney subscriber computing device;
inputting, via the client user computing device and the communication application, a communication session request to the attorney subscriber computing device;
initiating a communication session between the client user computing device and the attorney subscriber computing device in response to the communication session request, via the communication application;
wherein the communication session is configured to be selectively conducted via the communication application in a non-privileged mode and in a privileged mode;
wherein in the non-privileged mode, the communication session is conducted via the communication server in communication with the client user computing device and the attorney subscriber computing device;
wherein in the privileged mode the communication session is conducted via a direct communication link initiated via the communication application such that, in the privileged mode:
  the communication session is conducted between the client user computing device and the attorney subscriber computing device via the direct communication link; and
the communication server is disconnected from the direct communication link the communication application and communication server respectively configured to execute the method further comprising:
registering the attorney subscriber to the communication system, including:
  inputting attorney subscriber registration information via the communication application;
  receiving the attorney subscriber registration information to the communication server; and
  storing the attorney subscriber registration information in a data storage in communication with the communication server;
wherein:
  the attorney subscriber includes an attorney member; and
  the registration information includes attorney credential information corresponding to the attorney member;
the method further comprising:
  associating the attorney credential information with the attorney member in the data storage.

8. The system of claim 7, the communication application and communication server respectively configured to execute the method further comprising:
verifying the status of the attorney credential information of the attorney member; and
associating the verified status with the attorney credential information in the data storage.

9. The system of claim 8, further comprising:
periodically reverifying the status of the attorney credential information of the attorney member; and
revoking the verified status when the attorney credential cannot be reverified.

10. A computer-implemented method for conducting a privileged communication session between a client user and an attorney subscriber, the method comprising:
accessing, via a network, a communication application having a corresponding communication server;
wherein the communication server comprises a memory and a processor;
wherein the communication application is accessed by a client user computing device in communication with the network;
wherein the communication application is accessed by an attorney subscriber computing device in communication with the network;
inputting, via the client user computing device and the communication application, a communication session request to the attorney subscriber computing device;
initiating a communication session between the client user computing device and the attorney subscriber computing device in response to the communication session request, via the communication application;
wherein the communication session is configured to be selectively conducted via the communication application in a non-privileged mode and in a privileged mode;
wherein in the non-privileged mode, the communication session is conducted via the communication server in communication with the client user computing device and the attorney subscriber computing device;
wherein in the privileged mode the communication session is conducted via a direct communication link initiated via the communication application such that, in the privileged mode:
  the communication session is conducted between the client user computing device and the attorney subscriber computing device via the direct communication link; and
  the communication server is disconnected from the direct communication link;
further comprising:
  activating a timer, via the communication application, when the communication session is transitioned from the non-privileged mode to the privileged mode; and
  deactivating the timer, via the communication application, when the communication session is transitioned from the privileged mode to the non-privileged mode.

11. The method of claim 10, further comprising:
determining, via the timer, an elapsed time in the privileged mode; and
storing the elapsed time in a database.

12. The method of claim 11, further comprising:
transmitting the elapsed time to a billing module; and
generating a bill to the client user;
wherein the bill includes a billed amount determined by the elapsed time.

13. The method of claim 11, further comprising:
providing payor payment information for the client user to a payment processor via the communication application;
transmitting the elapsed time to the payment processor; and
processing, via the payment processor, a payment of a payment amount to the attorney subscriber;
wherein the payment amount is determined by the elapsed time.

14. A computer-implemented method for conducting a privileged communication session between a client user and an attorney subscriber, the method comprising:
accessing, via a network, a communication application having a corresponding communication server;
wherein the communication server comprises a memory and a processor;

wherein the communication application is accessed by a client user computing device in communication with the network;
wherein the communication application is accessed by an attorney subscriber computing device in communication with the network;
inputting, via the client user computing device and the communication application, a communication session request to the attorney subscriber computing device;
initiating a communication session between the client user computing device and the attorney subscriber computing device in response to the communication session request, via the communication application;
wherein the communication session is configured to be selectively conducted via the communication application in a non-privileged mode and in a privileged mode;
wherein in the non-privileged mode, the communication session is conducted via the communication server in communication with the client user computing device and the attorney subscriber computing device;
wherein in the privileged mode the communication session is conducted via a direct communication link initiated via the communication application such that, in the privileged mode:
the communication session is conducted between the client user computing device and the attorney subscriber computing device via the direct communication link; and
the communication server is disconnected from the direct communication link;
wherein initiating a communication session further comprises:
generating, via the communication application, a communication session interface; and
displaying, via the communication session interface, a mode indicator configured to display an enabled mode of the communication session;
wherein the enabled mode is the non-privileged mode or the privileged mode.

15. A computer-implemented method for conducting a privileged communication session between a client user and an attorney subscriber, the method comprising:
accessing, via a network, a communication application having a corresponding communication server;
wherein the communication server comprises a memory and a processor;
wherein the communication application is accessed by a client user computing device in communication with the network;
wherein the communication application is accessed by an attorney subscriber computing device in communication with the network;
inputting, via the client user computing device and the communication application, a communication session request to the attorney subscriber computing device;
initiating a communication session between the client user computing device and the attorney subscriber computing device in response to the communication session request, via the communication application;
wherein the communication session is configured to be selectively conducted via the communication application in a non-privileged mode and in a privileged mode;
wherein in the non-privileged mode, the communication session is conducted via the communication server in communication with the client user computing device and the attorney subscriber computing device;
wherein in the privileged mode the communication session is conducted via a direct communication link initiated via the communication application such that, in the privileged mode:
the communication session is conducted between the client user computing device and the attorney subscriber computing device via the direct communication link; and
the communication server is disconnected from the direct communication link;
further comprising:
joining an additional participant to the communication session in the privileged mode;
wherein the additional participant is a qualified privileged person; and
wherein the communication session in the privileged mode is conducted between the client user computing device, the attorney subscriber computing device, and the additional participant via the direct communication link with the communication server disconnected from the direct communication link.

* * * * *